(12) United States Patent
Nishida et al.

(10) Patent No.: US 7,968,622 B2
(45) Date of Patent: Jun. 28, 2011

(54) INKJET INK COMPOSITION FOR COLOR FILTER, PRODUCTION METHOD FOR COLOR FILTER, AND COLOR FILTER

(75) Inventors: Tomonori Nishida, Tokyo-to (JP); Masashi Nishiyama, Tokyo-to (JP); Masato Tezuka, Tokyo-to (JP); Atsushi Sato, Aichi (JP); Yukihiro Kato, Aichi (JP)

(73) Assignees: Dai Nippon Printing Co., Ltd., Tokyo (JP); NOF Corporation, Tokyo (JP)

( * ) Notice: Subject to any disclaimer, the term of this patent is extended or adjusted under 35 U.S.C. 154(b) by 169 days.

(21) Appl. No.: 11/909,637

(22) PCT Filed: Mar. 20, 2006

(86) PCT No.: PCT/JP2006/305573
§ 371 (c)(1),
(2), (4) Date: Sep. 25, 2007

(87) PCT Pub. No.: WO2006/103976
PCT Pub. Date: Oct. 5, 2006

(65) Prior Publication Data
US 2009/0061167 A1    Mar. 5, 2009

(30) Foreign Application Priority Data
Mar. 25, 2005  (JP) ................. 2005-090173

(51) Int. Cl.
B05D 5/06 (2006.01)
B05D 5/12 (2006.01)
C08F 8/00 (2006.01)
C08F 222/40 (2006.01)
C08F 283/00 (2006.01)
C08F 283/10 (2006.01)
C08G 59/38 (2006.01)
C08G 59/50 (2006.01)
C08G 59/14 (2006.01)
C08J 3/00 (2006.01)
C08K 3/20 (2006.01)
C08L 63/00 (2006.01)
C08L 37/00 (2006.01)
C08L 39/00 (2006.01)
C09D 5/00 (2006.01)
C09D 11/00 (2006.01)
G02B 5/22 (2006.01)
G02B 7/00 (2006.01)
G02F 1/1335 (2006.01)
G03B 21/14 (2006.01)
G03G 13/01 (2006.01)
H01L 21/00 (2006.01)

(52) U.S. Cl. ............ 523/160; 427/58; 427/68; 427/108; 427/110; 349/106; 353/84; 359/885; 359/892; 430/46.3; 430/46.4; 438/70; 523/161; 523/400; 523/427; 525/107; 525/524; 525/530; 524/548

(58) Field of Classification Search .................. 523/160, 523/161, 400, 427; 525/107, 524, 530; 427/58, 427/68, 108, 110; 349/106; 353/84; 359/885; 359/892; 430/46.3, 46.4; 438/70; 524/548
See application file for complete search history.

(56) References Cited

U.S. PATENT DOCUMENTS

| | | | | |
|---|---|---|---|---|
| 4,002,599 A | * | 1/1977 | Graham | ............ 528/99 |
| 6,111,044 A | | 8/2000 | Yamamoto et al. | |
| 2004/0266980 A1 | * | 12/2004 | Ideno et al. | ......... 528/365 |

FOREIGN PATENT DOCUMENTS

| | | |
|---|---|---|
| JP | 04-218561 | 8/1992 |
| JP | 09-021910 | 1/1997 |
| JP | 2001-091732 | 4/2001 |
| JP | 2001-350010 | 12/2001 |
| JP | 2001-350012 | 12/2001 |
| JP | 2003-066223 | 3/2003 |
| JP | 2004-339332 | 12/2004 |
| JP | 2004-339333 | 12/2004 |

OTHER PUBLICATIONS

Machine language English translation of JP 2003-066223.*

* cited by examiner

*Primary Examiner* — Patrick D Niland
(74) *Attorney, Agent, or Firm* — Ladas & Parry LLP

(57) ABSTRACT

An ink-jet composition for a color filter excellent in storage stability, straightness and sustainability at the time of ejection from a head, wherein a cured layer thereof is excellent in heat resistance, adhesive property, and solvent resistance. The ink-jet ink composition for a color filter is a specific epoxy group-containing polymer (A), a specific epoxy group-containing compound (B) having two or more specific epoxy groups and a polycarboxlic acid derivative (C) in which specific carboxylic acid (c1) having alicyclic hydrocarbon is rendered latent by vinyl ether (c2), wherein the equivalence ratio of carboxyl groups rendered latent by the polycarbonoxylic acid derivative (C) to the total epoxy groups contained in the epoxy-group containing polymer (A) and the epoxy-group containing compound (B) is in the range from 0.7 to 1.1.

8 Claims, 2 Drawing Sheets

[FIG. 1]
1(A) 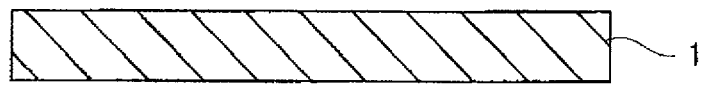
1(B) 
1(C) 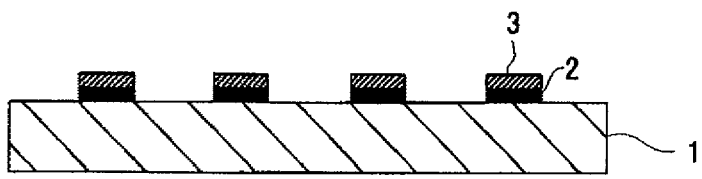
1(D) 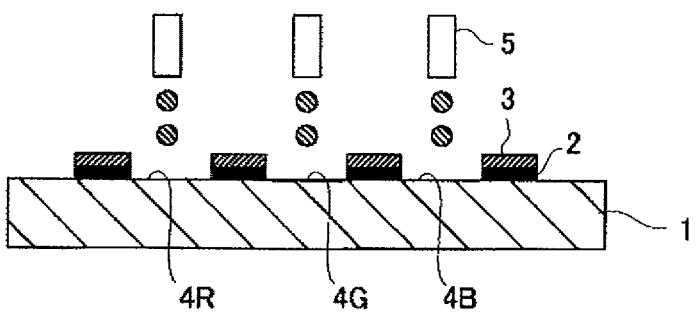
1(E) 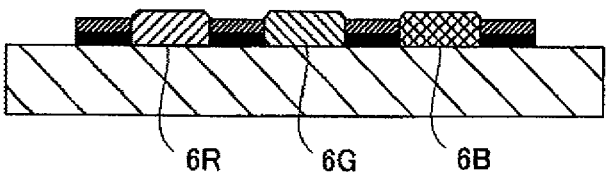
1(F) 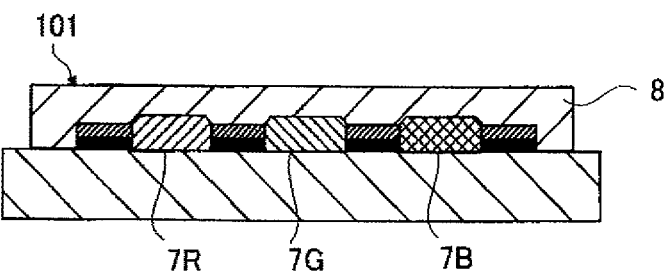

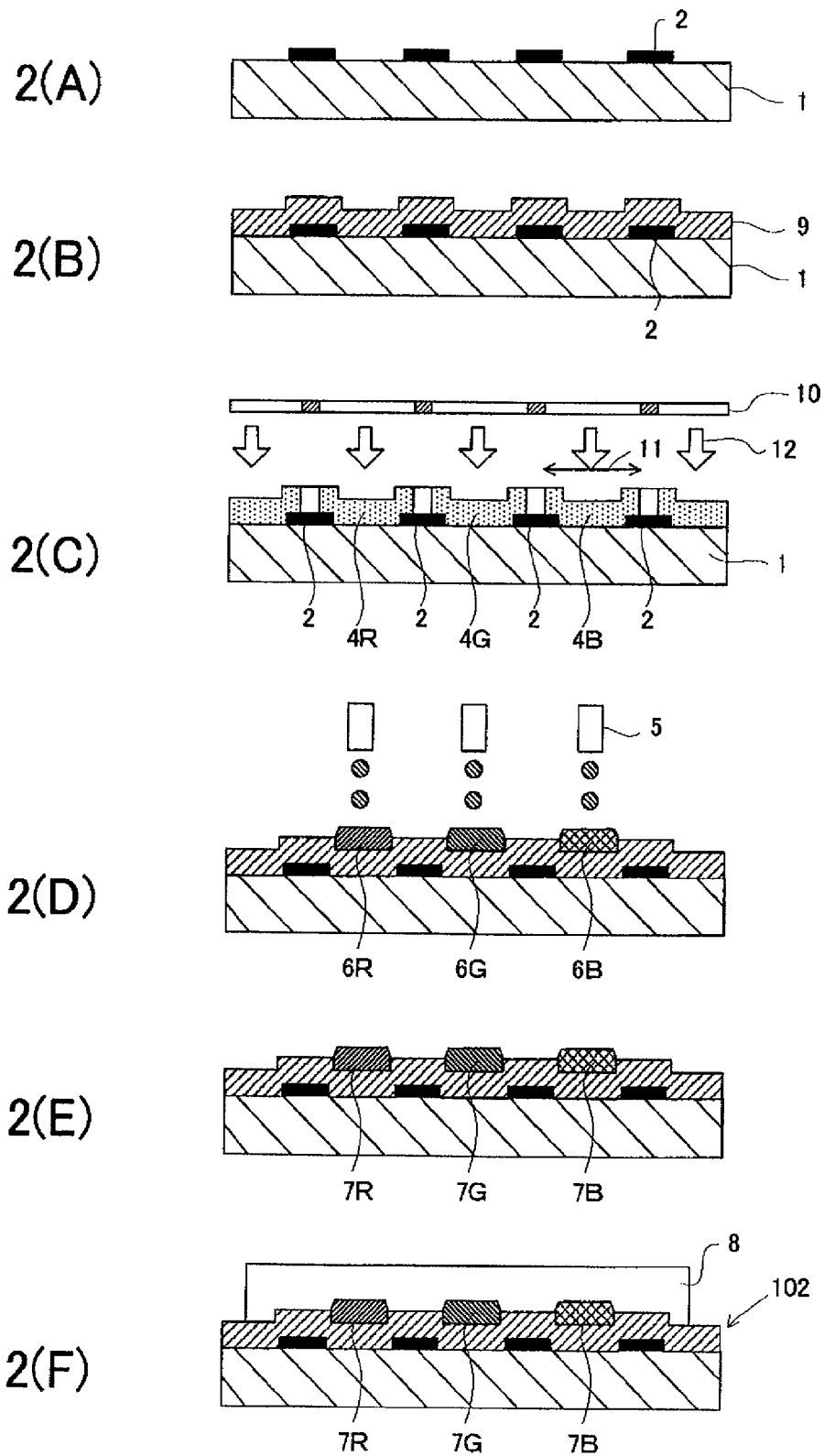
[FIG. 2]

INKJET INK COMPOSITION FOR COLOR FILTER, PRODUCTION METHOD FOR COLOR FILTER, AND COLOR FILTER

TECHNICAL FIELD

The present invention relates to an ink-jet ink composition for a color filter used for forming a cured layer of a predetermined pattern, such as a pixel part (a coloring layer), a production method of a color filter with the use of the ink-jet ink composition, and a color filter produced with the use of the ink composition.

BACKGROUND ART

Recently, with the development of personal computers, in particular, with the development of portable personal computers, a demand for a liquid crystal display, particularly for a color liquid crystal display has been increased. However, since the color liquid crystal display is expensive, there is an increasing demand for cost reduction. In particular, cost reduction for a color filter, whose proportion in the cost is high, is highly requested.

Such a color filter is normally provided with coloring patterns of three primary colors of red (R), green (G) and blue (B). A liquid crystal can be operated as a shutter by powering on and off electrodes respectively corresponding to each of pixels of R, G and B, and light passes through the each pixel of R, G or B so as to display color images.

Detail portions of the color filter such as the pixel part, a pillar-like spacer, a protect layer or the like can be provided by forming a coating layer of a predetermined pattern using a resin, drying and solidifying the same, and as needed, further curing the same by the cross-linking reaction.

To the resin layer comprising the details, a performance to a certain degree is required in terms of the common physical properties as a layer such as the adhesion property, the evenness of the layer thickness, the strength, the hardness and the heat resistance which does not cause thermal shrinkage or decrease of the layer thickness in the color filter production process. Moreover, for example, to the resin layer as the pixel part whose optical characteristics are regarded as important, it is required to have the excellent characteristics particularly in terms of the pattern shape accuracy, the transparency, and the discoloration resistance or the like.

Further, in the present circumstances that a liquid crystal display device is required to display more high-quality and precise images, reduction in resistance and thickness of ITO (Indium Tin Oxide) transparent electrode is necessary as a solution. Accordingly, sputtering at higher temperature is required to be included in the ITO transparent electrode forming process. Thus, a resin layer making up detail portions of a color filter is also required to be heat resistant in the formation of the ITO transparent electrode at such high temperature.

As a conventional method of producing a color filter, for example, there is known a dying method. According to the dying method, first a layer of a water-soluble polymer material as a dying material is formed on a glass substrate, patterning the same in a desired shape by a photolithography process, and soaking the obtained pattern in a dying bath so as to obtain a colored pattern. By repeating the operation for three times, R, G and B color filter layers can be formed.

As another method, there is a pigment dispersing method. According to the method, first a photosensitive resin layer with a pigment dispersed therein is formed on a substrate. A single color pattern is obtained by patterning the same. By repeating the same operation for three times, color filter layers of R, G and B can be formed.

As still another method, an electro-deposition method, a method of dispersing a pigment in a thermosetting type resin, printing three times for R, G and B, and thermally setting the resin or the like can be presented.

However, the same process should be repeated for three times in either method of coloring the three primary colors of R, G and B, and thus a problem of cost increase and a problem of a decrease in yield due to the repetition of the same process, are involved.

As a production method of a color filter capable of solving the problems, in Patent Document 1, a method of forming a coloring layer (pixel part) by shooting a colored ink containing a thermosetting resin onto the substrate surface by the ink-jet method and heating the same is disclosed.

In order to form the pixels by shooting the ink Patent Document 2 according to an accurate pattern by the ink-jet method, straightness and sustainability are required at the time of the ejecting operation from the ejection head. However, in the case where the evaporation rate of the ink is too high, the ink viscosity is increased drastically at the nozzle end of the ejection head so as to exhibit multiple ejections or deflection of shooting direction of the ink droplets, or clogging is generated in the case of intermittent ejection with a time interval so as to disable the re-ejection.

Moreover, in the case of forming the details of the color filter with a thermosetting type resin, it is common to utilize polymerization and/or the cross-linking reaction of the acid component and the epoxy component. In order to improve the strength, the hardness, the heat-resistance or the like of the cured layer, it is preferable to increase the cross-linking density of the cured layer. In order to increase the cross-linking density of the epoxy-based thermosetting type resin layer, it is preferable to increase the reactive site concentrations of the acid component and the epoxy component in a coating liquid or a coating layer formed from the coating liquid as much as possible. However, since the acid component can hardly be dissolved in an organic solvent, it has been difficult to have a large amount of acid component coexisting in the coating liquid (in the reaction system). Moreover, even in the case where a sufficiently large mount of the acid component corresponding to the epoxy component amount can coexist in the coating liquid, a deterioration in the time passage stability is caused due to too high reactivity of the coating liquid, as a result, the viscosity change (in particular the viscosity rise) can easily be generated in a short time so that there is a risk of difficulty in stable ejection by the ink-jet method.

To solve the problems, Patent Document 2 discloses an ink-jet ink composition for a color filter with the use of a blocked carboxylic acid curing agent. Herein, a curing agent in which aromatic carboxylic acid is blocked is preferably used; however, in the case of using a curing agent containing an aromatic group, storage stability, for which there is an increasing demand in recent years, is not always sufficient.

Patent Document 1: Japanese Patent Application Laid-Open No. Hei. 9-21910
Patent Document 2: Japanese Patent Application Laid-Open No. 2003-66223

DISCLOSURE OF INVENTION

More particularly, for example, in the case of forming a coloring layer by shooting the ink-jet ink composition onto the substrate by the ink-jet method, the shape stability of a coating layer may be inferior when the solid concentration of the ink composition is low. When the solid concentration of the ink composition is low, it is necessary to increase a heaping amount (deposited amount) of the ink per unit area so as to be colored in a desired color; however, if the heaping amount of the ink composition is excessively large, a liquid film of the ink composition deposited on an ink layer forming portion disposed on the substrate is broken to overrun to the surrounding area, and finally color mixture may occur. Accordingly, increasing the solid concentration of the ink composition is demanded. However, there is a problem that increasing the solid concentration excessively deteriorates the storage stability of the ink composition.

The present invention has been achieved in view of the above-mentioned circumstances, and a first object of the present invention is to provide an ink-jet ink composition for a color filter excellent in storage stability particularly even in the case of having a high solid concentration, straightness and sustainability at the time of ejection from a head, wherein a cured layer thereof is excellent in heat resistance, adhesive property, and solvent resistance.

A second object of the present invention is to provide a method of producing a highly reliable color filter using said ink composition capable of achieving the above-mentioned objects.

A third object of the present invention is to provide a color filter produced using said ink composition capable of achieving the above-mentioned objects.

As the result of diligent researches made to attain the above objects, the inventors of the present invention found out that a specific ink-jet ink composition for a color filter is excellent in storage stability, straightness and sustainability when ejected from a head, and a cured layer thereof is excellent in heat resistance, adhesive property, and solvent resistance. Therefore, the inventors of the present invention completed the present invention based on the above knowledge.

The ink-jet ink composition for a color filter according to the present invention comprises an epoxy group-containing polymer (A) having a weight average molecular weight from 2,000 to 20,000 in terms of the polystyrene calibrated-weight average molecular weight and an epoxy equivalence from 140 to 1,000 g/mol which is polymerized using at least a monomer having a carbon-carbon unsaturated bond and an epoxy group; an epoxy group-containing compound (B) having two or more epoxy groups, a molecular weight from 160 to 7,000 and an epoxy equivalence from 80 to 3,500 g/mol; and a polycarboxylic acid derivative (C) in which carboxylic acid (c1) having the structure represented by the following Formula (1) is rendered latent by vinyl ether (c2), wherein the equivalence ratio of carboxyl groups rendered latent by the polycarboxylic acid derivative (C) to the total epoxy groups contained in the epoxy-group containing polymer (A) and the epoxy-group containing compound (B) is in the range from 0.7 to 1.1, Formula (1):

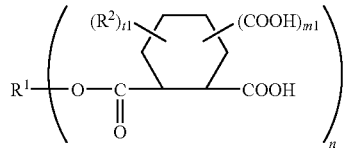

wherein, a 6-membered ring is an alicyclic hydrocarbon; m1 is an integer from 0 to 2; t1 is an integer of 0 or 1; n is an integer from 1 to 4; $R^1$ is a hydrogen atom or a hydrocarbon group having 2 to 8 carbon atoms when n is 1; $R^1$ is a hydrocarbon group having 2 to 8 carbon atoms when n is 2, 3 or 4; and $R^2$ is an alkyl group having 1 to 5 carbon atoms.

In the present invention, the ink-jet ink composition for a color filter is preferably dissolved or dispersed in an organic solvent (D) as needed, and the organic solvent (D) preferably contains as the main solvent a solvent component having a 180° C. to 260° C. boiling point and a 0.5 mmHg or less vapor pressure at an ordinary temperature by a 80% by weight or more ratio with respect to the total amount of the solvent. The solvent component having a boiling point from 180° C. to 260° C. and a 0.5 mmHg or less vapor pressure at an ordinary temperature (particularly in the range from 18° C. to 25° C.) has appropriate drying and evaporating properties. Thus, by using a solvent containing a high ratio of such a solvent, it cannot be dried rapidly at the nozzle end of the ejection head, drastic viscosity rise of the ink or clogging cannot be generated so that the sustainability of drop direction or drop mass magnitude can be further improved. Therefore, by ejecting the ink composition of the present invention to the substrate surface according to a predetermined pattern by the ink-jet method, a coloring layer particularly requiring minuteness and precision such as a pixel part and a black matrix layer can be formed accurately and uniformly.

The ink-jet ink composition for a color filter of the present invention preferably comprises a thermal potential catalyst (E) to show the activity at the time of thermal curing from the viewpoint of promoting the thermosetting reaction between the acid and the epoxy groups and improving the hardness and the thermal resistance of the cured layer.

Also, the ink-jet ink composition for a color filter of the present invention may comprise further a pigment so as to form a coloring layer such as a pixel part or a black matrix layer. A coloring layer such as a pixel part or a black matrix layer is required to be particularly minute and precise. Even in the case where a pigment is contained, the ink composition of the present invention can ensure a sufficient dispersing property. Thus, a minute and precise coloring layer can be accurately formed by stably ejecting the ink composition from the head of the ink-jet method. Moreover, according to the present invention, a coloring layer excellent in heat resistance, adhesive property, and solvent resistance can be formed.

The production method of a color filter according to the present invention comprises the steps of forming an ink layer by making the ink-jet ink composition for a color filter according to the present invention selectively adhere on a predetermined area of a substrate by the ink-jet method and forming a cured layer by heating the ink layer.

The production method of a color filter according to the present invention preferably comprises further a step of forming an ink layer forming area with an ink affinity larger than that of the surroundings by selectively changing wettability in a predetermined area of the substrate surface and forms an ink layer by making the ink-jet ink for a color filter according to the present invention selectively adhere on the ink layer forming area by the ink-jet method. In this case, after making the ink adhere on the ink layer forming area, the wetting and spreading property of the ink increases so as to prevent color missing or unevenness of layer thickness more efficiently.

The color filter according to the present invention is a color filter comprising at least a substrate and a coloring layer provided on the substrate, wherein the coloring layer is formed by curing the ink-jet ink composition for a color filter according to the present invention.

According to the present invention, it is possible to obtain an ink-jet ink composition for a color filter excellent in storage stability particularly even in the case of having a high solid concentration, straightness and sustainability at the time of ejection from a head, wherein a cured layer thereof is excellent in heat resistance, adhesive property, and solvent resistance.

Also, according to the production method of a color filter of the present invention, the excellent sustainability of drop direction and drop mass magnitude of the ink composition can be provided so that a minute and precise ink layer can be accurately formed. In addition, since the production method comprises the step of forming a cured layer by curing the ink layer formed with the use of the ink-jet ink having a high reactive site concentration of the present invention, a cured layer having a high cross-linking density and excellent in heat resistance, adhesive property, and solvent resistance can be obtained. Moreover, cost reduction or an increase in yield is achievable since it is a production method using the ink-jet method.

Further, according to the present invention, a minute and precise, highly reliable color filter provided with the cured layer excellent in heat resistance, adhesive property, and solvent resistance can be obtained.

BRIEF DESCRIPTION OF DRAWINGS

In the accompanying drawings,

FIGS. 1(A) to 1(F) are views explaining a production method for a color filter using the ink-jet ink according to the present invention.

FIGS. 2(A) to 2(F) are views explaining the other production method for a color filter using the ink-jet ink according to the present invention.

1: Transparent substrate; 2: Light shielding part; 3: Ink-repellent convex part; 4: Pixel part forming area; 5: Ink-jet head; 6: Ink layer; 7: Pixel part; 8: Protect layer; 9: Photo-catalyst-containing layer; 10: Photomask; 11: Exposed portion; 12: Light; and 101, 102: Color filter.

BEST MODE FOR CARRYING OUT THE INVENTION

Hereinafter, the present invention will be described in detail.

1. Ink-Jet Ink for Color Filter

The ink-jet ink composition for a color filter according to the present invention comprises an epoxy group-containing polymer (A) having a weight average molecular weight from 2,000 to 20,000 in terms of the polystyrene calibrated-weight average molecular weight and an epoxy equivalence from 140 to 1,000 g/mol which is polymerized using at least a monomer having a carbon-carbon unsaturated bond and an epoxy group; an epoxy group-containing compound (B) having two or more epoxy groups, a molecular weight from 160 to 7,000 and an epoxy equivalence from 80 to 3,500 g/mol; and a polycarboxylic acid derivative (C) in which carboxylic acid (c1) having the structure represented by the following Formula (1) is rendered latent by vinyl ether (c2), wherein the equivalence ratio of carboxyl groups rendered latent by the polycarboxylic acid derivative (C) to the total epoxy groups contained in the epoxy-group containing polymer (A) and the epoxy-group containing compound (B) is in the range from 0.7 to 1.1.

Formula (1):

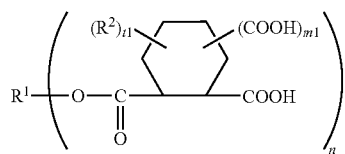

In the formula, a 6-membered ring is an alicyclic hydrocarbon; m1 is an integer from 0 to 2; t1 is an integer of 0 or 1; n is an integer from 1 to 4; $R^1$ is a hydrogen atom or a hydrocarbon group having 2 to 8 carbon atoms when n is 1; $R^1$ is a hydrocarbon group having 2 to 8 carbon atoms when n is 2, 3 or 4; and $R^2$ is an alkyl group having 1 to 5 carbon atoms.

In the present invention, a curing agent is dissolved or dispersed in a solvent to use after a hardly soluble polycarboxylic acid is made in a form of the highly soluble polycarboxylic acid derivative (C) by blocking the carboxyl group of the hardly soluble polycarboxylic acid and rendering the same latent. Therefore, the carboxyl group can coexist in the ink composition at a high concentration of its reactive sites with the epoxy group so that a high cross-linking density can be obtained by forming a layer using the ink composition and heating the same. Moreover, unless the polycarboxylic acid derivative (C) is heated to a predetermined temperature or higher according to the compound, a carboxyl group cannot be reproduced. Therefore, even though the reactive site concentrations of the epoxy group contained in the epoxy group-containing polymer (A) and the epoxy group-containing compound (B) and the carboxyl group contained in the polycarboxylic acid derivative (C) are high, a preferable viscosity can be maintained from immediately after preparation over a long term so that the excellent storage stability can be provided.

Especially, according to the present invention, due to using the polycarboxylic acid derivative (C) having the above-specified structure, a temperature at which the carboxyl group is brought out of latency and reproduced is high so that the storage stability of the composition, the straightness and sustainability at the time of ejection of the ink from a head can be remarkably excellent. Also, according to the present invention, a cured layer can obtain excellent heat resistance, adhesive property, and solvent resistance by using the specific epoxy group-containing polymer (A) and the specific epoxy group-containing compound (B) with the specific polycarboxylic acid derivative (C) in combination at a specific carboxyl group/epoxy group ratio. It is to be noted that in the present invention "cured layer" means a layer of a cured product formed from the reaction by heating or the like of the epoxy group with the latent carboxyl group both contained in the ink-jet ink.

Hereinafter, components used for the ink-jet ink according to the present invention will be described.

(Epoxy-Group Containing Polymer (A))

The epoxy-group containing polymer (A) in the ink composition of the present invention is a polymer which is polymerized using at least a monomer having a carbon-carbon unsaturated bond and an epoxy group (hereinafter, it may be referred to as an "epoxy-group containing monomer") and has two or more epoxy groups. The epoxy-group containing polymer (A) can be obtained by polymerizing an epoxy-group containing monomer solely or copolymerizing an epoxy-group containing monomer with other monomers. A molecular form thereof may have a straight chain or a branched structure, and it may be in any form of a random copolymer, a block copolymer or a graft copolymer.

The epoxy-group containing polymer (A) in the ink composition of the present invention may be copolymerized by a conventional polymerization method. That is, the polymerization method is not particularly limited, and a polymerization method such as a radical polymerization method, an ion polymerization method or the like may be employed. More specifically, in the presence of a polymerization initiator, a polymerization method such as a bulk polymerization method, a solution polymerization method, a suspension polymerization method, an emulsion polymerization method or the like may be employed. Depending on the method employed, a large amount of monomers may remain. If the monomers may affect the physical properties of an applied and cured layer, the monomers may be removed by a reduced pressure distillation method, a reprecipitation purification method or the like.

In the ink composition of the present invention, two or more kinds of monomers having different molecular weights or types of comonomers may be mixed to use to obtain the epoxy-group containing polymer (A).

As a preferable example of the epoxy-group containing polymer (A) in the ink composition of the present invention, one having at least one of the constitutional units represented by the following Formulae (2), (3) and (4) may be listed.

Formula (2):

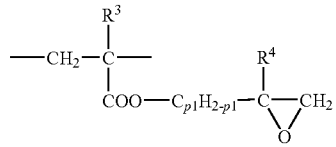

In the formula, $R^3$ is a hydrogen atom or an alkyl group having to 5 carbon atoms, $R^4$ is a hydrogen atom or an alkyl group having 1 or 2 carbon atoms, and p1 is an integer from 1 to 8.

Formula (3):

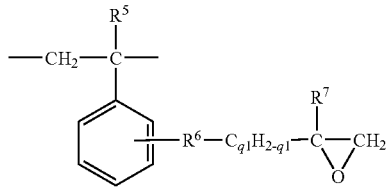

In the formula, $R^5$ is a hydrogen atom or an alkyl group having 1 to 5 carbon atoms, $R^6$ is —$CH_2O$— or —$CH_2$—, $R^7$ is a hydrogen atom or an alkyl group having 1 or 2 carbon atoms, and q1 is an integer from 0 to 7.

Formula (4):

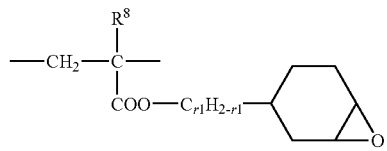

In the formula, $R^8$ is a hydrogen atom or an alkyl group having to 5 carbon atoms, and r1 is an integer from 1 to 8.

The epoxy-group containing polymer (A) in the ink composition of the present invention may further contain at least one of the structures represented by the following Formulae (5), (6) and (7) as the constitutional unit.

Formula (5):

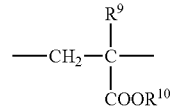

In the formula, $R^9$ is a hydrogen atom or an alkyl group having 1 to 12 carbon atoms. $R^{10}$ is a hydrogen atom, an alkyl group having 1 to 12 carbon atoms, an alicyclic hydrocarbon group having 3 to 12 carbon atoms composing the main ring structure, an aromatic hydrocarbon group, an aryloxy group or an aromatic polyalkylene glycol residue.

Formula (6):

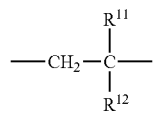

In the formula, $R^{11}$ is a hydrogen atom or an alkyl group having 1 to 12 carbon atoms, $R^{12}$ is a hydrogen atom, an alkyl group having 1 to 12 carbon atoms, an alkoxy group, a hydroxyalkyl group, a hydroxy group, a siloxyalkyl group or an aromatic hydrocarbon group.

Formula (7):

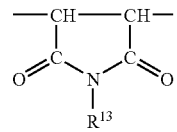

In the formula, $R^3$ is a hydrogen atom, an alkyl group having 1 to 12 carbon atoms, a cycloalkyl group or an aromatic hydrocarbon group.

The constitutional units represented by Formulae (2) to (4) are derived from monomers represented by the following Formulae (8) to (10) respectively.

Formula (8):

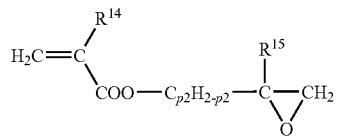

In the formula, $R^{14}$ is a hydrogen atom or an alkyl group having 1 to 5 carbon atoms, $R^{15}$ is a hydrogen atom or an alkyl group having 1 or 2 carbon atoms, and p2 is an integer from 1 to 8.

In Formula (8), as $R^{14}$ and $R^{15}$ respectively, a hydrogen atom or a methyl group is independently preferable. The specific examples of monomer represented by Formula (8) include glycidyl (meth)acrylate and β-methylglycidyl (meth) acrylate. Among them, glycidyl (meth)acrylate is preferable in terms of availability or the like. It is to be noted that the (meth)acrylate in the present invention may be either acrylate or methacrylate.

Formula (9):

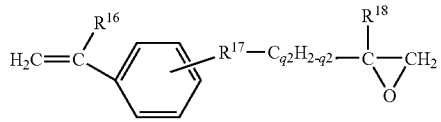

In the formula, $R^{16}$ is a hydrogen atom or an alkyl group having 1 to 5 carbon atoms, $R^{17}$ is a —CH$_2$O— group or a —CH$_2$— group, $R^{18}$ is a hydrogen atom or an alkyl group having 1 or 2 carbon atoms, and q2 is an integer from 0 to 7.

In Formula (9), as $R^{16}$ and $R^{18}$ respectively, a hydrogen atom or a methyl group is independently preferable. The —CH$_2$O— group is preferable as $R^{17}$. The specific examples of the monomer represented by Formula (9) include o-vinylbenzyl glycidyl ether, m-vinylbenzyl glycidyl ether, p-vinylbenzyl glycidyl ether, α-methyl-o-vinylbenzyl glycidyl ether, α-methyl-m-vinylbenzyl glycidyl ether and α-methyl-p-vinylbenzyl glycidyl ether. Among them, o-vinylbenzyl glycidyl ether, m-vinylbenzyl glycidyl ether and p-vinylbenzyl glycidyl ether are preferable in terms of availability or the like.

Formula (10):

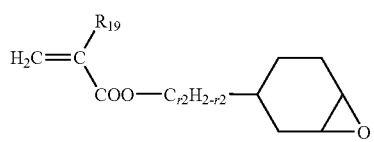

In the formula, $R^{19}$ is a hydrogen atom or an alkyl group having 1 to 5 carbon atoms, and r2 is an integer from 1 to 8.

In Formula (10), a hydrogen atom or a methyl group is preferable as $R^{19}$. The examples of the monomer represented by Formula (10) include 3,4-epoxycyclohexyl methyl(meth)acrylate. 3,4-epoxycyclohexyl methyl methacrylate is preferable in terms of the physical properties of the cured layer such as hardness and so on.

The constitutional units represented by Formulae (5) to (7) are derived from monomers represented by the following Formulae (11) to (13) respectively.

Formula (11):

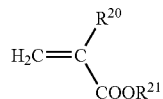

In the formula, $R^{20}$ is a hydrogen atom or an alkyl group having 1 to 12 carbon atoms. $R^2$ is a hydrogen atom, an alkyl group having 1 to 12 carbon atoms, an alicyclic hydrocarbon group having 3 to 12 carbon atoms composing the main ring structure, an aromatic hydrocarbon group, an aryloxy group or an aromatic polyalkylene glycol residue.

In Formula (11), the alicyclic hydrocarbon group having 3 to 12 carbon atoms composing the main ring structure represented by $R^{21}$ may contain an additional structure such as an endocyclic double bond, a hydrocarbon group as a side chain, a spiro cycle as a side chain, an endocyclic cross-linked hydrocarbon group and the like.

The specific examples of the monomer represented by Formula (11) include methyl (meth)acrylate, ethyl (meth) acrylate, cyclohexyl (meth)acrylate, methoxylated cyclodecatriene acrylate, para-t-butyl cyclohexyl (meth)acrylate, isobornyl (meth)acrylate, benzyl (meth)acrylate, dicyclopentenyl (meth)acrylate, tetrahydrofurfuryl (meth)acrylate, phenoxyethyl (meth)acrylate, phenoxydiethylene glycol (meth) acrylate, phenoxytetraethylene glycol (meth)acrylate, phenoxyhexaethylene glycol (meth)acrylate, phenyl (meth) acrylate and the like.

In Formula (11), hydrogen or a methyl group is preferable as $R^{20}$. As $R^{21}$, a cyclohexyl group or a dicyclopentenyl group is preferable. As the monomer represented by Formula (11), specifically, cyclohexyl methacrylate and dicyclopentenyl methacrylate are preferable in terms of the physical properties of the cured layer such as hardness, heat resistance and so on.

Formula (12):

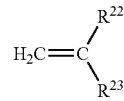

In the formula, $R^{22}$ is a hydrogen atom or an alkyl group having 1 to 12 carbon atoms. $R^{23}$ is a hydrogen atom, an alkyl group having 1 to 12 carbon atoms, an alkoxy group, a hydroxyalkyl group, a hydroxy group, a siloxyalkyl group or an aromatic hydrocarbon group.

The specific examples of the monomer represented by Formula (12) include ethylene, propylene, vinylcyclohexanone, styrene, vinyl toluene, t-butylstyrene, allylcyclopropane, α-methylstyrene, α-ethylstyrene and the like.

In Formula (12), hydrogen or a methyl group is preferable as $R^{23}$. As $R^{23}$, a phenyl group is preferable. As the monomer represented by Formula (12), specifically, styrene is preferable in terms of copolymerization capability with other types of monomers, availability and so on.

Formula (13):

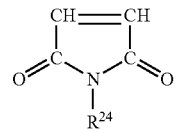

In the formula, $R^{24}$ is a hydrogen atom, an alkyl group having 1 to 12 carbon atoms, a cycloalkyl group or an aromatic hydrocarbon group.

The specific examples of the monomer represented by Formula (13) include N-methylmaleimide, N-ethylmaleimide, N-propylmaleimide, N-butylmaleimide, N-cyclohexylmaleimide, N-phenylmaleimide and the like.

In Formula (13), a cyclohexyl group and a phenyl group are preferable as $R^{24}$. As the monomer represented by Formula (13), specifically, N-cyclohexylmaleimide and N-phenylmaleimide are preferable in terms of the physical properties of the cured layer such as hardness, heat resistance and so on.

One or more kinds of the epoxy group-containing constitutional units represented by Formulae (2) to (4) are preferably contained by 10 to 100% by weight in the epoxy group-containing polymer (A) so as to control the epoxy equivalence in the range from 140 to 1,000 g/mol. If the epoxy group-containing constitutional units are less than 10% by weight, the applied and cured layer may be inferior in tenacity.

A weight average molecular weight (Mw) of the epoxy group-containing polymer (A) in the ink composition of the present invention is in the range from 2,000 to 20,000, more preferably from 3,000 to 15,000. If the weight average molecular weight (Mw) is less than 2,000, physical properties required for the cured layer as a detail portion of the color filter such as strength, solvent resistance and so on are liable to be insufficient. On the other hand, if it exceeds 20,000, the viscosity is liable to rise, thereby involving the risks that sustainability of drop mass magnitude and straightness of drop direction from the recording head is deteriorated, and that stability during a long term-storage is deteriorated. It is to be noted that the weight average molecular weight (Mw) of the epoxy group-containing polymer (A) is a weight average molecular weight in terms of the polystyrene calibrated-weight average molecular weight by the gel permeation chromatography (GPC) method.

The epoxy equivalence of the epoxy group-containing polymer (A) in the ink composition of the present invention is from 140 to 1,000 g/mol, preferably from 180 to 400 g/mol. If the epoxy equivalence is less than 140 g/mol, the applied and cured layer may be inferior in tenacity. If it exceeds 1,000 g/mol, the hardness of the cured layer may decrease. The "epoxy equivalence" in the present invention refers to an equivalence weight of the epoxy group of the polymer and is measured in accordance with JIS K 7236:2001 "Determination of epoxy equivalence in epoxy resins".

In the ink composition of the present invention, a combination ratio of the epoxy group-containing polymer (A) is preferably from 10 to 60% by weight, more preferably from 30 to 50% by weight, still more preferably from 25 to 45% by weight of a solid content of the ink composition. If the combination ratio of the epoxy group-containing polymer (A) is less than 10% by weight, performances of the cured layer such as adhesive property and so on may decrease. If it exceeds 60% by weight, the cured layer may be inferior in tenacity and it is difficult to obtain the effects of the present invention. It is to be noted that the solid content of the ink composition which is the basis for defining the combination ratio includes all ingredients only except the solvent, and the epoxy group-containing component in a liquid state or the like is also included therein.

(Epoxy Group-Containing Compound (B))

The epoxy group-containing compound (B) in the ink composition of the present invention has two or more epoxy groups in a molecule.

A molecular weight of the epoxy group-containing compound (B) in the ink composition of the present invention is from 160 to 7,000, preferably from 200 to 6,500, more preferably from 200 to 6,000. If the molecular weight is less than 160, the hardness of the cured layer may decrease. If it exceeds 7,000, the shape of pixels may deteriorate. It is to be noted that the molecular weight of the epoxy group-containing compound (B) is just the molecular weight when having no molecular weight distribution. When having a molecular weight distribution, it is the weight average molecular weight in terms of the polystyrene calibrated-weight average molecular weight by the gel permeation chromatography (GPC) method.

An epoxy equivalence of the epoxy group-containing compound (B) is from 80 to 3,500 g/mol, preferably from 100 to 3,300 g/mol. If the epoxy equivalence is less than 80 g/mol, the cross-linking density of the cured layer increases so that the cured layer may be inferior in tenacity. If it exceeds 3,500 g/mol, the cross-linking density decreases so that the hardness of the cured layer may significantly decrease.

There is no particular limitation to the epoxy group-containing compound (B) in the ink composition of the present invention as far as it meets the above-mentioned conditions and contains two or more epoxy groups in one molecule. For example, there may be used bisphenol A type epoxy resin, bisphenol F type epoxy resin, brominated bisphenol A type epoxy resin, bisphenol S type epoxy resin, diphenyl ether type epoxy resin, hydroquinone type epoxy resin, naphthalene type epoxy resin, biphenyl type epoxy resin, fluorene type epoxy resin, phenolic novolac type epoxy resin, orthocresol novolac type epoxy resin, trishydroxyphenylmethane type epoxy resin, trifunctional epoxy resin, tetraphenylolethane type epoxy resin, dicyclopentadiene phenol type epoxy resin, hydrogenerated bisphenol A type epoxy resin, polyol-containing bisphenol A type epoxy resins, polypropylene glycol type epoxy resin, glycidyl ester type epoxy resin, glycidylamine type epoxy resin, glyoxal type epoxy resin, alicyclic epoxy resin, heterocyclic epoxy resin or the like.

Specific examples include bisphenol A type epoxy resin such as EPIKOTE 828 (product name; manufactured by Japan Epoxy Resins Co., Ltd.), EPIKOTE 1007 (product name; manufactured by Japan Epoxy Resins Co., Ltd.) or the like; bisphenol F type epoxy resin such as YDF-175S (product name; manufactured by Tohto Kasei Co., Ltd.) or the like; brominated bisphenol A type epoxy resin such as YDB-715 (product name; manufactured by Tohto Kasei Co., Ltd.) or the like; bisphenol S type epoxy resin such as EPICLON EXA 1514 (product name; manufactured by Dainippon Ink & Chemicals, Inc.) or the like; hydroquinone type epoxy resin such as YDC-1312 (product name; manufactured by Tohto Kasei Co., Ltd.) or the like; naphthalene type epoxy resin such as EPICLON EXA4032 (product name; manufactured by Dainippon Ink & Chemicals, Inc.) or the like; biphenyl type epoxy resin such as EPIKOTE YX4000H (product name; manufactured by Japan Epoxy Resins Co., Ltd.) or the like; bisphenol A type novolac epoxy resin such as EPIKOTE 157S70 (product name; manufactured by Japan Epoxy Resins Co., Ltd.) or the like; phenolic novolac type epoxy resin such as YDPN-638 (product name; manufactured by Tohto Kasei Co., Ltd.) or the like; cresol novolac type epoxy resin such as YDCN-701 (product name; manufactured by Tohto Kasei Co., Ltd.) or the like; dicyclopentadiene phenol type epoxy resin such as EPICLON HP-7200 (product name; manufactured by Dainippon Ink & Chemicals, Inc.) or the like; trishydroxyphenylmethane type epoxy resin such as EPIKOTE 1032H60 (product name; manufactured by Japan Epoxy Resins Co., Ltd.) or the like; trifunctional epoxy resin such as VG3101M80 (product name; manufactured by Mitsui Chemicals, Inc.) or the like; tetraphenylolethane type epoxy resin such as EPIKOTE 1031S (product name; manufactured by Japan Epoxy Resins Co., Ltd.) or the like; four functional epoxy resin such as DENACOL EX-411 (product name; manufactured by Nagase Chemicals Ltd.) or the like; hydrogenerated bisphenol A type epoxy resin such as ST-3000 (product name; manufactured by Tohto Kasei Co., Ltd.) or the like; glycidyl ester type epoxy resin such as EPIKOTE 190P (product name; manufactured by Japan EpoxyResins Co., Ltd.) or the like; glycidylamine type epoxy resin such as YH-434 (product name; manufactured by Tohto Kasei Co., Ltd.) or the like; glyoxal type epoxy resin such as YDG-414 (product name; manufactured by Tohto Kasei Co., Ltd.) or the like; alicyclic polyfunctional epoxy resin such as EPOLEAD GT-401 (product name; manufactured by Daicel Chemical Industries, Ltd.) or the like; heterocyclic epoxy resin such as triglycidyl isocyanate (TGIC) or the like; and so on. If necessary, as a diluent having epoxy reactivity, NEOTOHTO-E (product name; manufactured by Tohto Kasei Co., Ltd.) or the like may be mixed.

Among the polyfunctional epoxy resins, bisphenol A type epoxy resin such as EPIKOTE 828 (product name; manufactured by Japan Epoxy Resins Co., Ltd.), EPIKOTE 1007 (product name; manufactured by Japan Epoxy Resins Co., Ltd.) or the like; bisphenol A type novolac epoxy resin such as EPIKOTE 157S70 (product name; manufactured by Japan Epoxy Resins Co., Ltd.) or the like; and cresol novolac type epoxy resin such as YDCN-701 (product name; manufactured by Tohto Kasei Co., Ltd.) or the like are particularly preferable.

The epoxy group-containing compound (B) in the ink composition of the present invention may be used solely or in combination of two or more kinds.

When the epoxy group-containing compound (B) is contained in the ink composition of the present invention, the combination ratio of the epoxy group-containing compound (B) is preferably from 10 to 70% by weight, more preferably from 15 to 60% by weight, still more preferably from 15 to 55% by weight of the solid content of the ink composition. If the combination ratio of the epoxy group-containing compound (B) is less than 10% by weight, performances of the cured layer such as adhesive property and so on may decrease. If it exceeds 70% by weight, the cured layer may be inferior in tenacity and it is difficult to obtain the effects of the present invention.

It is to be noted that a monofunctional epoxy group-containing compound which contains one epoxy group in one molecule may be added to the ink composition of the present invention. At this time, it is preferable to adjust the amount of the monofunctional epoxy group-containing compound to less than 100% by weight with respect to the total weight of the components (A), (B) and (C). If an amount of an epoxy group-containing compound which is not included in the component (B) is 100% by weight or more, the cross-linking density of the cured layer decreases and it is difficult to obtain the effects of the present invention.

(Polycarboxylic Acid Derivative (C))

The polycarboxylic acid derivative (C) in the ink composition of the present invention is a compound in which a carboxylic group of carboxylic acid (c1) having the structure represented by the following Formula (1) is rendered latent (hereinafter, it may be referred to as "blocked") by a vinyl ether compound (c2) (a vinyl group- and an ether group-containing compound) represented by the following Formula (14). The polycarboxylic acid derivative (C) used in the present invention is a component capable of significantly improving the storage stability of the composition and increasing the ejection sustainability since the carboxyl group is rendered latent and the temperature at which the carboxyl group is brought out of latency is high. Further, the polycarboxylic acid derivative (C) in the present invention can coexist with the epoxy group at a high concentration so that it is a component capable of increasing adhesive property, or heat resistance and solvent resistance during an ITO process.

Formula (1):

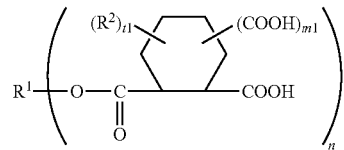

In the formula, a 6-membered ring is an alicyclic hydrocarbon; m1 is an integer from 0 to 2; t1 is an integer of 0 or 1; n is an integer from 1 to 4; $R^1$ is a hydrogen atom or a hydrocarbon group having 2 to 8 carbon atoms when n is 1; $R^1$ is a hydrocarbon group having 2 to 8 carbon atoms when n is 2, 3 or 4; and $R^2$ is an alkyl group having 1 to 5 carbon atoms.

The carboxyl group is rendered latent by making a reaction as in the following Formula (15) with the vinyl group. Since the reaction is relatively easy to be carried out, the polycarboxylic acid derivative (C) can be obtained in high yield. Thus, the polycarboxylic acid derivative (C) has a structure represented by the following Formula (16) in which the carboxylic acid is rendered latent.

Formula (14):

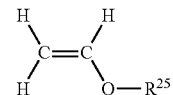

In the formula, $R^{25}$ is a hydrocarbon group having 1 to 10 carbon atoms.

Formula (15):

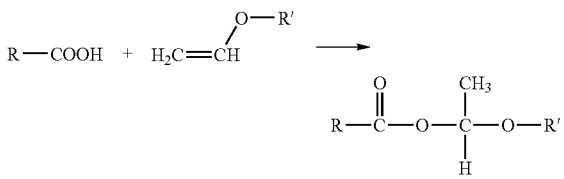

Formula (16):

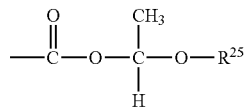

In the formula, $R^{25}$ is a hydrocarbon group having 1 to 10 carbon atoms.

Among the carboxylic acids (c1) represented by Formula (1), as the compound having other than a hydrogen atom as $R^1$, there may be a half-ester which can be obtained by the reaction of an alcohol compound with acid anhydride.

As a preferable example of the alcohol compound used for the reaction, there may be mentioned a monovalent alcohol compound such as ethanol, propanol, hexanol, octanol, isopropyl alcohol or the like; a divalent alcohol compound such as ethylene glycol, propylene glycol, butanediol, hexanediol, neopentyl glycol, cyclohexanediol or the like; a trivalent alcohol compound such as glycerin, pentanetriol, hexanetriol, cyclohexanetriol, benzenetriol, trimethylolpropane or the like; and a tetravalent alcohol compound such as pentaerythritol or the like. More preferably, there may be mentioned hexanol, isopropyl alcohol, 1,2-propylene glycol, 1,3-propylene glycol, 1,6-hexanediol, glycerin, trimethylolpropane and pentaerythritol.

As the acid anhydride used for the reaction, there may be the compound represented by the following Formula (17). Specifically, 1,2-cyclohexane dicarboxylic anhydride and 1,3,4-cyclohexane tricarboxylic acid-3,4-anhydride are mentioned as a preferable example thereof.

Formula (17):

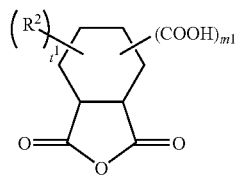

In the formula, a 6-membered ring is an alicyclic hydrocarbon; m1 is an integer from 0 to 2; t1 is an integer of 0 or 1; $R^2$ is an alkyl group having 1 to 5 carbon atoms.

When the carboxylic acid (c1) represented by Formula (1) has a hydrogen atom as $R^1$, a polycarboxylic acid derivative (C) in which the carboxylic acid group is blocked has a high dissolving power. Therefore, it may be suitably used in combination with the component (A) or (B) having low miscibility. As the compound having a hydrogen atom as $R^1$, there may be alicyclic dicarboxylic acid such as cyclohexane dicarboxylic acid or the like; alicyclic tricarboxylic acid such as 1,2,4-cyclohexane tricarboxylic acid (hereinafter, it is referred to as CHTA) or the like; and alicyclic tetracarboxylic acid such as 1,2,4,5-cyclohexane tetracarboxylic acid or the like. Among the compounds, CHTA is mentioned as a preferable example.

The acid equivalence of the carboxylic acids (c1) is preferably from 55 to 600 g/mol, more preferably from 60 to 500 g/mol. If the acid equivalence of the carboxylic acid is less than 55 g/mol, cross-linking density increases so that the tenacity of the cured layer may decrease. If it exceeds 600 g/mol, miscibility with the ink composition may deteriorate. The carboxylic acids which meet these conditions and can be suitably used with the ink composition of the present invention may be used solely or in combination of two or more kinds. Said acid equivalence refers to the equivalent weight of the carboxyl group and is measured in accordance with JIS K 0070-3 (1992).

As the vinyl ether (c2) represented by Formula (14) which is a material of the polycarboxylic acid derivative (C) in the ink composition of the invention, for example, there may be alkyl vinyl ethers such as isopropyl vinyl ether, n-propyl vinyl ether, n-butyl vinyl ether, isobutyl vinyl ether, t-butyl vinyl ether, 2-ethylhexyl vinyl ether, cyclohexyl vinyl ether or the like. As the vinyl ether (c2) which can be suitably used for the ink composition of the present invention, there is mentioned n-propyl vinyl ether and isobutyl vinyl ether. They may be used solely or in combination.

The polycarboxylic acid derivative (C) used in the present invention can be obtained by reacting said carboxylic acid (c1) with said vinyl ether compound (c2) at a temperature in the range from room temperature to 150° C. Since the blocking reaction is an equilibrium reaction, the reaction can be promoted by using a slightly increased amount of the vinyl ether (c2) with respect to that of the carboxylic acid (c1) so as to increase the yield. Specifically, the mol equivalent ratio of the vinyl group of the vinyl ether to the carboxyl group of the carboxylic acid (c1) [the mol equivalent ratio of (vinyl group/carboxyl group)] is desirably from 1/1 to 2/1. If the mol equivalent ratio exceeds 2/1, it may be not possible to increase the reaction temperature so that the reaction rate may be extremely slow. There may be a case that it is better to partially render (block) the carboxylic acid (c1) latent depending on usage. In that case, the mol equivalent ratio may be from 0.5/1 to 1/1.

When the block reaction is performed, an acid catalyst may be used in order to promote the reaction. As such a catalyst, for example, there may be an acidic phosphoric acid ester compound represented by the following Formula (18).

Formula (18):

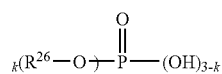

In the formula, $R^{26}$ is an alkyl group, a cycloalkyl group or an aryl group having 3 to 10 carbon atoms, and k is 1 or 2.

Also, when the block reaction is performed, an organic solvent may be used in order to make the reaction system homogeneous and the reaction easily occur. As the organic solvent used at this time, for example, there may be aromatic hydrocarbon, ethers, esters and ether-esters, ketones, phosphoric acid esters, nitrites, aprotic polar solvents, propylene glycol alkyl ether acetates or the like. More preferably, there may be cyclohexanone or propylene glycol methyl ether acetate.

A use amount of the organic solvent is not particularly limited; however, it is usually from 5 to 95 parts by mass, preferably from 20 to 80 parts by mass, with respect to a reactant of 100 parts by mass. When the organic solvent is added, an active ingredient concentration decreases so that a compounding amount of the polycarboxylic acid derivative (C) (including the solvent) increases than the range specified in Claim of the present invention. In this case, however, the compounding amount of the polycarboxylic acid derivative (C) is considered as the active ingredient excluding the solvent.

Especially in the present invention, a ratio between the total compounding amount of the epoxy group-containing polymer (A) and the epoxy group-containing compound (B) and the compounding amount of the polycarboxylic acid derivative (C) is adjusted to be in the following range. That is, they are compounded so as to adjust the equivalence ratio of the carboxyl group being rendered latent in the polycarboxylic acid derivative (C) and the total epoxy group contained in the epoxy group-containing polymer (A) and the epoxy group-containing compound (B) (the reaction equivalence of the carboxyl group/the reaction equivalence of the epoxy group) to be in the range from 0.7 to 1.1. The reaction equivalence of the carboxyl group being rendered latent in the polycarboxylic acid derivative (C) is not referred to the reaction equivalence of only the carboxyl group being rendered latent. It means the reaction equivalence of all of the carboxyl groups which are present after the polycarboxylic acid derivative (C) is brought out of latency, and also means the reaction equivalence of the carboxyl group of the carboxylic acid represented by the corresponding Formula (1). In the present invention, especially by optimizing the equivalence ratio (the reaction equivalence of the carboxyl group/the reaction equivalence of the epoxy group) in the range from 0.7 to 1.1, the cross-linking density increases so that heat resistance, solvent resistance and adhesive property become particularly excellent. If the equivalence ratio is less than 0.7, a lot of epoxy groups remain after curing so that the cross-linking density decreases, and solvent resistance and adhesive property may significantly decrease. On the other hand, if the equivalence ratio exceeds 1.1, the carboxyl group becomes excess so that adhesive property may decrease.

When a compound containing a carboxyl group or a compound containing a functional group including an epoxy group which is capable of reacting with a carboxyl group is added as an additional component which is not contained in the essential components (A), (B) and (C) of the ink composition of the present invention, it is preferable to incorporate such compound so as to adjust the ratio between the reaction equivalence of the carboxyl group contained in the composition and the reaction equivalence of the functional group including an epoxy group which is capable of reacting with the carboxyl group in the composition to be in the above-mentioned range.

Herein, the reaction equivalence of the carboxyl group is calculated from, to put it simply, a compound structural formula (a molecular weight) and a compounding amount. More accurately, it is calculated from an acid equivalence measured in accordance with JIS K 0070:1992 "Test methods for acid value, saponification value, ester value, iodine value, hydroxyl value and unsaponifiable matter of chemical products."

In the ink composition of the present invention, the combination ratio of the polycarboxylic acid derivative (C) is not particularly limited as far as it meets the above-mentioned reaction equivalence ratio. However, it is preferably from 10 to 60% by weight, more preferably from 15 to 55% by weight, still more preferably from 15 to 50% by weight of the solid content of the ink composition. If the combination ratio of the polycarboxylic acid derivative (C) is less than 10% by weight, performances such as heat resistance and so on may decrease. If it exceeds 60% by weight, performances such as adhesive property and so on may decrease. Thus, in both cases, it is difficult to obtain the effects of the present invention.

(Organic Solvent (D))

An organic solvent (D) may be incorporated with the ink composition of the present invention as required in order to prepare the ink composition as a liquid with high concentration or an ink in a state capable of being elected from the head as it is.

There is no particular limitation to the organic solvent (D) if it is a solvent which can appropriately dissolve or disperse the solid content in order to prepare the ink-jet ink for a color filter of the present invention to be a highly-concentrated ink for storage or an ink in a concentration so as to be applied as it is.

Since the ink composition of the present invention is excellent in the storage stability (the viscosity stability) of the above-mentioned binder components (A) to (C), the ejecting performance from the head of the ink jet method is excellent. For the purpose of further improving the ejecting performance, it is preferable to use, as a main solvent, a solvent component which has a 180° C. to 260° C. boiling point, particularly a 210° C. to 260° C. boiling point, and a 0.5 mmHg (66.7 Pa) or less vapor pressure, particularly a 0.1 mmHg (13.3 Pa) or less vapor pressure, at an ordinary temperature (in particular, 18° C. to 25° C.), and such a main solvent is preferably incorporated at a ratio of 80% by weight or more, particularly 85% by weight or more with respect to the total amount of the organic solvent (D). Surface tension of the main solvent is preferably 29 mN/m or more.

The solvent component with a 180° C. to 260° C. boiling point and a 0.5 mmHg (66.7 Pa) or less vapor pressure at an ordinary temperature has proper drying and vaporizing properties. Accordingly, if a simple or mixed solvent containing such a solvent component with a high composition ratio is used, the ink is not rapidly dried at a nozzle end of the recording head, so that rapid viscosity rise of the ink or clogging of the recording head is not caused, thus avoiding a bad influence on the straightness and sustainability of the ejection. In addition, since a drying of the ink using such a solvent proceeds at a proper speed after shooting it on a surface to be subject to the coating operation (a coating receptive surface), the ink fits on the coating receptive surface to make a surface of the coating layer even and smooth, and then the ink can be rapidly and completely dried by an air drying or an ordinary heating operation. A risk is small in remaining of the solvent in the coating layer after the drying operation in comparison with the case using a wetting agent or a solvent with a very high boiling point.

In many cases of using the pigment as the coloring agent for the ink composition of the present invention, the pigment is endowed with dispersibility in advance by mixing it with a dispersing agent in a solvent which is a part of the whole amount of the solvent to be used, and thus obtained pigment dispersion (i.e., a pigment dispersion with a high concentration) is incorporated into a remainder solvent together with the other compositional ingredients and mixed, thereby making the ink composition. In order to prepare the pigment dispersion, it is necessary to use a solvent capable of easily dispersing the pigment such as 3-methoxybutyl acetate, propylene glycol monomethyl ether acetate (PGMEA) or the like.

A solvent component other than the main solvent such as a dispersing solvent for preparing the pigment dispersion may be contained in the organic solvent (D) of the ink composition as required if it is a small amount. However, even in such a case, it is necessary to use the main solvent with the above-mentioned boiling point and vapor pressure at a ratio of 60% by weight or more with respect to the total amount of the solvent. If the ratio of the main solvent is less than 60% by weight of the whole solvent, it is difficult to securely obtain the drying and vaporizing properties suitable for the ink-jet method.

The main solvent is desirable to be used at the highest composition ratio possible, and more specifically it is preferable to be 60% by weight or more, more preferable to be 70% by weight or more, and most preferable to be as close to 80% by weight as possible. Accordingly, it is preferable that the main solvent is appropriately selected so as to be used by mixing with the dispersing solvent, or used as it is as the dispersing solvent, at the time when preparing the pigment dispersion.

In the case where an inkphilic region with an ink affinity is formed on a portion of a substrate where an ink layer is desired to be formed by forming a wettability-variable layer on a surface of the substrate and subjecting it to an exposing operation, and then the ink composition of the present invention is made to selectively adhere to the inkphilic region by the ink jet method, it is preferable to select and use, as the main solvent, a solvent with a 25° or more contact angle, preferably 30° or more contact angle, with respect to the surface of a test piece with a 30 mN/m critical surface tension found in a Zisman plotting graph using a standard liquid specified in the wettability test defined in the JIS-K6768, and measuring the contact angle (θ) 30 seconds later from contact with liquid droplets, and a 10° or less contact angle with respect to the surface of a test piece with a 70 mN/m critical surface tension found in the same measurement method.

When the ink composition is prepared with the use of the solvent exhibiting the above-mentioned behavior in the wettability, the ink composition exhibits a large ink-repellent property with respect to a surface of the wettability-variable layer before changing wettability of the wettability-variable layer to be hereinafter explained, and it exhibits a large affinity with respect to a surface of the wettability-variable layer after changing wettability of the wettability-variable layer in the direction of enlarging the hydrophilicity. Therefore, the great difference can be made between a wettability of the ink composition with respect to the inkphilic region which is formed by selectively exposing a portion of the surface of the wettability-variable layer to the light and a wettability of the same with respect to a repellent region which is surrounding the inkphilic region, and then the ink composition shot on the inkphilic region by the ink jet method comes to entirely spread to this region and uniformly wet this region. As a result, an ink layer with a minute and precise pattern can be formed by the ink jet method.

In the present invention, any material is allowed to form the test piece having the above-mentioned properties in the critical surface tension. As the test piece with a 30 mN/m critical surface tension, one meeting this requirement can be picked up from among, for example, polymethyl methacrylate, polyvinyl chloride, polyvinylidene chloride and polyethylene terephthalate having a smooth surface respectively, one produced by coating any one of the above polymers, a surface modifying agent or the like on a smooth surface of the glass or the like, by practically carrying out the above-mentioned test. Further, as the test piece with a 70 mN/m critical surface tension, it can be picked up from among, for example, nylon, one produced by subjecting a surface of glass to the hydrophilic treatment or the like, by practically carrying out the above-mentioned test.

The main solvent can be used by selecting from among such solvents as mentioned below: glycol ethers such as ethylene glycol monoethyl ether; glycol ether esters such as ethylene glycol monomethyl ether acetate; glycol oligomer ethers such as diethylene glycol monomethyl ether; glycol oligomer ether esters such as diethylene glycol monomethyl ether acetate; aliphatic carboxylic acids or anhydride thereof such as acetic acid, 2-ethylhexanoic acid or acetic acid anhydride; aliphatic or aromatic esters such as ethyl acetate or propyl benzoate; dicarboxylic acid diesters such as diethyl carbonate; alkoxycarboxylic acid esters such as methyl 3-methoxy propionate; ketocarboxylic acid esters such as ethyl acetoacetate; halogenocarboxylic acids such as chloroacetic acid or dichloroacetic acid; alcohols or phenols such as ethanol, isopropanol or phenol; aliphatic or aromatic ethers such as diethyl ether or anisole; alkoxyalcohols such as 2-ethoxy ethanol and 1-methoxy-2-propanol; glycol oligomers such as diethylene glycol or tripropylene glycol; amino alcohols such as 2-diethyl amino ethanol or triethanol amine; alkoxyalcohol esters such as 2-ethoxy ethyl acetate; ketones such as acetone or methyl isobutyl ketone; morpholines such as N-ethyl morpholine or phenyl morpholine; aliphatic or aromatic amines such as pentyl amine, tripentyl amine or aniline.

As the organic solvent (D), in particular the main solvent almost occupying the organic solvent (D), it is preferable to use a solvent not containing a hydroxyl group. If the solvent contains the hydroxyl group, the dispersibility and the dispersing stability of the pigment are inferior. In addition, since the polycarboxylic acid derivative (C) is stimulated out of latency so that the carboxyl group becomes liable to be generated, it is capable of reacting with the epoxy group contained in the epoxy group-containing polymer (A) and the epoxy group-containing compound (B) to deteriorate the storage stability (the viscosity stability).

Therefore, the use of the solvent not containing a hydroxyl group as the organic solvent (D) further improves the viscosity stability of the ink composition, thereby obtaining an ink excellent in the ejecting performance and the storage stability.

Preferable examples of the main solvent include ethylene glycol monobutyl ether acetate, diethylene glycol monobutylether acetate, diethylene glycol monoethyl ether acetate, diethylene glycol dibutyl ether, diethyl adipate, dibutyl oxalate, dimethyl malonate, diethyl malonate, dimethyl succinate, diethyl succinate or the like. Since these solvents satisfy the requirements not only to have a 180° C. to 260° C. boiling point and a 0.5 mmHg (66.7 Pa) or less vapor pressure at an ordinary temperature, but also to have no hydroxyl group in its molecule, the above-mentioned problems are not caused. Further these solvents can be used in combination by mixing it with a solvent which has been conventionally used for preparing the pigment dispersion, such as 3-methoxybutyl acetate or propylene glycol monomethyl ether acetate (PGMEA), or used as it is as a dispersing solvent by mixing with no other solvent, thereby preparing the pigment dispersion.

The above-mentioned solvents of the preferable example also satisfy the requirement to have a 25° or more contact angle with respect to the surface of a test piece with a 30 mN/m critical surface tension found in a Zisman plotting graph using a standard liquid specified in the wettability test defined in the JIS-K6768, and measuring the contact angle (θ) 30 seconds later from contact with liquid droplets, and a 10° or less contact angle with respect to the surface of a test piece with a 70 mN/m critical surface tension found in the same measurement method. Accordingly, in the case where the wettability-variable layer is provided on the substrate surface and subjected to the exposure, and then the ink composition is made to selectively adhere thereto by utilizing the difference in the wettability between the exposed and the unexposed portions, these solvents can be suitably used as the main solvent as well.

If the moisture is immixed in the solvent, it means that the hydroxyl group of the water molecule is present in the solvent, and the same problem as in the case of using the solvent with the hydroxyl group may be caused. Therefore it is preferable that a coating liquid is prepared with the use of a solvent with a low miscibility with the water in order to substantially exclude the moisture from the cross-linking reaction system between the acid and the epoxy. In this view, preferable solubility of the solvent for preparing the ink composition with respect to the water is 20 parts by weight or less with respect to 100 parts by weight of water at 20° C. of liquid temperature.

Among the above-mentioned specific examples of the main solvent, diethylene glycol monobutylether acetate is particularly preferable, because it has no hydroxyl group and exhibits a low miscibility to the water in extent of 6.5 parts by weight dissolvable with respect to 100 parts by weight of water with 20° C. of liquid temperature.

The organic solvent (D) is usually used at a ratio of 40 to 95% by weight, more preferably 70 to 95% by weight, with respect to the total amount of the ink composition including the solvent itself to prepare the ink composition. If an amount of the solvent is excessively small, a viscosity of the ink is high and the ejecting operation from the ink-jet head is difficult. On the other hand, if an amount of the solvent is excessively large, a liquid film deposited on a predetermined wettability-variable portion (an ink layer forming portion) is broken to overrun to the surrounding unexposed portion at the time a heaping level (a deposited amount) of the ink is not enough yet, and it may be further wetly spread to an adjacent wettability-variable portion (an ink layer forming portion). In other words, when a heaping amount of the ink capable of being deposited, with no overrunning, on the wettability-variable portion (an ink layer forming portion) which is defined as an area where the ink must adhere becomes insufficient, a layer thickness after drying becomes excessively thin, thereby not obtaining a transmitted light having sufficient optical density.

(Thermal Potential Catalyst (E))

To the ink composition of the present invention, a catalyst capable of promoting the thermosetting reaction between the acid and the epoxy may be added in order to improve the hardness and the thermal resistance of the cured layer. As such a catalyst, a thermal potential catalyst (E) capable of showing the activity at the time of thermal curing (it will be simply called hereafter as "a component (E)" or "a thermal potential catalyst (E)") can be used.

When the thermal potential catalyst (E) is heated, it exhibits the catalytic activity to promote the curing reaction, thereby providing good physical properties for a cured product. The thermal potential catalyst (E) can be added if necessary. As the thermal potential catalyst (E), one starting catalyst-activity when a heating temperature rises at 60° C. or more is preferable, and examples to be preferably used include: a compound produced by neutralizing a proton acid with a Lewis base; a compound produced by neutralizing a Lewis acid with a Lewis base; a mixture of a Lewis acid and a trialkyl phosphate; sulfonic acid esters; onium compounds; or the like, and various compounds disclosed in Japanese Patent Application Laid-Open No. H04-218561 or the like can be also used. More specifically, the following compounds can be exemplified as the preferable thermal potential catalyst (E):

(i) A compound produced by neutralizing halogeno carboxylic acids, sulfonic acids, phosphoric monoesters, phosphoric diesters or the like with amines (ammonia, monomethyl amine, triethyl amine, pyridine, ethanolamines or the like), trialkylphosphine or the like;

(ii) A compound produced by neutralizing a Lewis acid such as $BF_3$, $FeCl_3$, $SnCl_4$, $AlCl_3$, $ZnCl_2$ or the like with the Lewis base such as any one of the compounds exemplified above;

(iii) An ester compound produced by reacting methanesulfonic acid, ethanesulfonic acid, benzensulfonic acid or the like with primary alcohol or secondary alcohol; and (iv) A phosphoric monoester or diester compound derived from primary alcohols, secondary alcohols or the like. As the onium compound, there may be an ammonium compound $[R_3NR']^+X^-$, a sulfonium compound $[R_3SR']^+X^-$, an oxonium compound $[R_3OR']^+X^-$ or the like, wherein R and R' are groups such as alkyl, alkenyl, aryl, alkoxy or the like respectively.

It is preferable that the thermal potential catalyst (E) is (E') a halogen-free acidic catalyst (it will be simply called hereafter as "a component (E')" or "a halogen-free acidic catalyst (E')" in view of contamination of the liquid crystal or the like. Specific examples of the halogen-free acidic catalyst (E') include NOFCURE LC-1, NOFCURE LC-2 AND NOFCURE LC-10 (product names; manufactured by NOF CORPORATION).

The thermal potential catalyst is usually incorporated in an amount in the range from about 0.01 to about 10.0 parts by weight with respect to 100 parts by weight of the total of the components (A) to (C).

(Pigment)

In the case where a coloring layer such as a pixel part, a black matrix layer or the like is formed using the ink composition according to the present invention, a pigment or the other coloring agent is contained in the ink composition.

The pigment to be used as the coloring agent can be optionally selected from among organic and inorganic coloring agents in accordance with a required color such as R, G, B or the like of the pixel part. As the organic coloring agent, it is possible to use, for example, dyes, organic pigments, natural coloring matters or the like. Further, as the inorganic coloring agents, it is possible to use, for example, inorganic pigments, extender pigments or the like. Among the material, the organic pigment is superior in the coloring property and also the thermal resistance, and preferably used. As the organic pigment, there may be exemplified compounds sorted in the Pigment group by the color index (C.I.; published by the Society of Dyers and Colourists), and more specifically exemplified ones identified by the following color index (C.I.) numbers.

C.I. Pigment Yellow 1, C.I. Pigment Yellow 3, C.I. Pigment Yellow 12, C.I. Pigment Yellow 13, C.I. Pigment Yellow 14, C.I. Pigment Yellow 15, C.I. Pigment Yellow 16, C.I. Pigment Yellow 17, C.I. Pigment Yellow 20, C.I. Pigment Yellow 24, C.I. Pigment Yellow 31, C.I. Pigment Yellow 55, C.I. Pigment Yellow 60, C.I. Pigment Yellow 61, C.I. Pigment Yellow 65, C.I. Pigment Yellow 71, C.I. Pigment Yellow 73, C.I. Pigment Yellow 74, C.I. Pigment Yellow 81, C.I. Pigment Yellow 83, C.I. Pigment Yellow 93, C.I. Pigment Yellow 95, C.I. Pigment Yellow 97, C.I. Pigment Yellow 98, C.I. Pigment Yellow 100, C.I. Pigment Yellow 101, C.I. Pigment Yellow 104, C.I. Pigment Yellow 106, C.I. Pigment Yellow 108, C.I. Pigment Yellow 109, C.I. Pigment Yellow 110, C.I. Pigment Yellow 113, C.I. Pigment Yellow 114, C.I. Pigment Yellow 116, C.I. Pigment Yellow 117, C.I. Pigment Yellow 119, C.I. Pigment Yellow 120, C.I. Pigment Yellow 126, C.I. Pigment Yellow 127, C.I. Pigment Yellow 128, C.I. Pigment Yellow 129, C.I. Pigment Yellow 138, C.I. Pigment Yellow 139, C.I. Pigment Yellow 150, C.I. Pigment Yellow 151, C.I. Pigment Yellow 152, C.I. Pigment Yellow 153, C.I. Pigment Yellow 154, C.I. Pigment Yellow 155, C.I. Pigment Yellow 156, C.I. Pigment Yellow 166, C.I. Pigment Yellow 168, C.I. Pigment Yellow 175;

C.I. Pigment Orange 1, C.I. Pigment Orange 5, C.I. Pigment Orange 13, C.I. Pigment Orange 14, C.I. Pigment Orange 16, C.I. Pigment Orange 17, C.I. Pigment Orange 24, C.I. Pigment Orange 34, C.I. Pigment Orange 36, C.I. Pigment Orange 38, C.I. Pigment Orange 40, C.I. Pigment Orange 43, C.I. Pigment Orange 46, C.I. Pigment Orange 49, C.I. Pigment Orange 51, C.I. Pigment Orange 61, C.I. Pigment Orange 63, C.I. Pigment Orange 64, C.I. Pigment Orange 71, C.I. Pigment Orange 73; C.I. Pigment Violet 1, C.I. Pigment Violet 19, C.I. Pigment Violet 23, C.I. Pigment Violet 29, C.I. Pigment Violet 32, C.I. Pigment Violet 36, C.I. Pigment Violet 38;

C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48:1, C.I. Pigment Red 48:2, C.I. Pigment Red 48:3, C.I. Pigment Red 48:4, C.I.

Pigment Red 49:1, C.I. Pigment Red 49:2, C.I. Pigment Red 50:1, C.I. Pigment Red 52:1, C.I. Pigment Red 53:1, C.I. Pigment Red 57, C.I. Pigment Red 57:1, C.I. Pigment Red 57:2, C.I. Pigment Red 58:2, C.I. Pigment Red 58:4, C.I. Pigment Red 60:1, C.I. Pigment Red 63:1, C.I. Pigment Red 63:2, C.I. Pigment Red 64:1, C.I. Pigment Red 81:1, C.I. Pigment Red 83, C.I. Pigment Red 88, C.I. Pigment Red 90:1, C.I. Pigment Red 97, C.I. Pigment Red 101, C.I. Pigment Red 102, C.I. Pigment Red 104, C.I. Pigment Red 105, C.I. Pigment Red 106, C.I. Pigment Red 108, C.I. Pigment Red 112, C.I. Pigment Red 113, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 151, C.I. Pigment Red 166, C.I. Pigment Red 168, C.I. Pigment Red 170, C.I. Pigment Red 171, C.I. Pigment Red 172, C.I. Pigment Red 174, C.I. Pigment Red 175, C.I. Pigment Red 176, C.I. Pigment Red 177, C.I. Pigment Red 178, C.I. Pigment Red 179, C.I. Pigment Red 180, C.I. Pigment Red 185, C.I. Pigment Red 187, C.I. Pigment Red 188, C.I. Pigment Red 190, C.I. Pigment Red 193, C.I. Pigment Red 194, C.I. Pigment Red 202, C.I. Pigment Red 206, C.I. Pigment Red 207, C.I. Pigment Red 208, C.I. Pigment Red 209, C.I. Pigment Red 215, C.I. Pigment Red 216, C.I. Pigment Red 220, C.I. Pigment Red 224, C.I. Pigment Red 226, C.I. Pigment Red 242, C.I. Pigment Red 243, C.I. Pigment Red 245, C.I. Pigment Red 254, C.I. Pigment Red 255, C.I. Pigment Red 264, C.I. Pigment Red 265; C.I. Pigment Blue 15, C.I. Pigment Blue 15:3, C.I. Pigment Blue 15:4, C.I. Pigment Blue 15:6, C.I. Pigment Blue 60; C.I. Pigment Green 7, C.I. Pigment Green 36; C.I. Pigment Brown 23, C.I. Pigment Brown 25; and C.I. Pigment Black 1, Pigment Black 7.

Further as specific examples of the inorganic pigments or the extender pigments, there may be exemplified titanium oxide, barium sulfate, calcium carbonate, zinc white, lead sulfate, yellow lead, zinc yellow, iron oxide red (red iron oxide (III)), cadmium red, ultramarine blue, Prussian blue, chromium oxide green, cobalt green, amber, titanium black, synthetic iron black, carbon black or the like. In the present invention, the pigment may be used solely or in combination of two or more kinds.

In the case where the ink composition of the present invention is used to form a light shielding layer with a certain pattern on a substrate of a color filter, a black pigment superior in the light shielding property is contained in the ink composition. As the black pigment superior in the light shielding property, it is preferable to use an inorganic coloring agent such as carbon black, iron oxide black or the like, or an organic coloring agent such as cyanine black or the like.

In the case where the ink composition according to the present invention is used to form pixels, the pigment is generally incorporated in an amount in the range from 1 to 60% by weight, preferably from 15 to 40% by weight, with respect to the solid content of the ink composition. If an amount of the pigment is excessively small, a transmission density of a coating of the ink-jet ink having a predetermined layer thickness (usually from 0.1 to 2.0 μm) may be insufficient. If the amount of the pigment is excessively large, at the time when applying the ink-jet ink onto a substrate and curing the same to be a coating layer, properties required for the coating layer such as the adhesive property to the substrate, a smooth surface, the hardness and so on may be insufficient.

(Other Components)

One or two or more kinds of the other additives may be contained as required in the ink composition of the present invention. As such additives, there may be exemplified the followings.

a) Dispersing Agent

In the case of incorporating the pigment in the ink composition, a dispersing agent may be incorporated in the ink composition as required in order to disperse the pigment in a good condition. As the dispersing agent, it is possible to use, for example, a cationic, an anionic, a nonionic, an amphoteric, a silicone based, and a fluorine based dispersing agent or the like. Among the dispersing agents, polymer type surface active agents (polymer type dispersing agents) exemplified below are preferable.

That is, preferably used polymer type surface active agents are: polyoxy ethylene alkyl ethers such as polyoxy ethylene lauryl ether, polyoxy ethylene stearyl ether, polyoxy ethylene oleyl ether or the like; polyoxy ethylene alkyl phenyl ethers such as polyoxy ethylene octyl phenyl ether, polyoxy ethylene nonyl phenyl ether or the like; polyethylene glycol diesters such as polyethylene glycol dilaurate, polyethylene glycol distearate or the like; sorbitan fatty acid esters; fatty acid modified polyesters; tertiary amine modified polyurethanes or the like.

b) Dispersing Assistant Agent

There may be, for example, blue pigment derivatives such as copper phthalocyanine derivatives, yellow pigment derivatives or the like.

c) Filler

There may be, for example, glass, alumina or the like.

d) Adhesion Enhancing Agent

There may be, for example, vinyl trimethoxy silane, vinyl triethoxy silane, vinyl tris (2-methoxyethoxy) silane, N-(2-aminoethyl)-3-aminopropyl methyl dimethoxy silane or the like.

e) Antioxidant

There may be, for example, 2,2-thiobis (4-methyl-6-t-butylphenol), 2,6-di-t-butylphenol or the like.

f) Ultraviolet Ray Absorbent

There may be, for example, 2-(3-t-butyl-5-methyl-2-hydroxyphenyl)-5-chlorobenzotri azole, alkoxy benzophenone or the like.

g) Aggregation Inhibitor

There may be, for example, sodium polyacrylate, various kinds of the surface active agent or the like.

h) Leveling Agent

There may be, for example, silicone based, polyalkylene ether based, fatty acid ester based, and special acrylic polymers available from the market respectively or the like.

(Preparation Method of Ink-Jet Ink Composition)

The ink-jet ink composition for a color filter of the present invention may be produced in such a manner that each component is charged into a simple or mixed solvent and mixed to dissolve or disperse the solid content.

However, in the case that the pigment is directly charged into the entire solvent together with the other components such as the binder component, agitated and mixed, the pigment cannot be dispersed sufficiently in the solvent in many cases. Therefore, in general, a solvent with good dispersing property and dispersing stability to the pigment is used, and the pigment is introduced therein together with a dispersing agent and sufficiently agitated by means of a dissolver or the like, thereby preparing a pigment dispersion. Then, the obtained pigment dispersion is introduced into a solvent containing mostly a main solvent or only a main solvent together with the components other than the pigment and agitated and mixed sufficiently by means of a dissolver or the like, thus obtaining an ink composition of the present invention.

As a remainder solvent into which the pigment dispersion is to be introduced, it is possible to use a solvent composition defined by subtracting a portion corresponding to a solvent used for preparation of the pigment dispersion from the whole solvent composition to be finally desired and complete the ink-jet ink diluted to a final concentration. Alternatively, it is possible to prepare an ink-jet ink with a high concentration by introducing the pigment dispersion into a relatively small amount of the main solvent. The ink-jet ink with a high concentration can be stored as it is and applied to the ink jet method by diluting to the final concentration just before using it.

In the present invention, especially in the case that as a main solvent a solvent component having a 180° C. to 260° C. boiling point and a 0.5 mmHg or less vapor pressure at ordinary temperature is used at a composition ratio of 90% by weight or more of the total amount of the whole solvent, a conventionally used dispersing solvent such as 3-methoxy-butyl acetate or propylene glycol monomethyl ether acetate (PGMEA) may be restricted so as not to be used at a sufficient amount when preparing the pigment dispersion. In such a case, a mixture solvent which is prepared by selecting a solvent having relatively good dispersibility and dispersing stability for the pigment from among those usable as the main solvent, and mixing the same with a conventionally used dispersing solvent is used as a dispersing solvent for the present invention. Alternatively, the main solvent is used as it is as a dispersing solvent for the present invention.

In the ink composition of the present invention prepared as above, a curing agent is dissolved or dispersed in a solvent to use after a hardly soluble polycarboxylic acid is made in a form of the highly soluble polycarboxylic acid derivative (C) by rendering (blocking, capping, protecting) the carboxyl group of the polycarboxylic acid latent. Therefore, the carboxyl group can coexist in the ink composition at a high concentration of its reactive sites with the epoxy group so that a high cross-linking density can be obtained by forming a layer using the ink composition and heating the same. Moreover, unless the polycarboxylic acid derivative (C) is heated to a predetermined temperature or higher according to the compound, a carboxyl group cannot be reproduced. Especially, since the polycarboxylic acid derivative (C) has the specific structure, the reaction temperature at which the polycarboxylic acid derivative (C) is brought out of latency is high so that it is highly stable. Therefore, even though the reactive site concentrations of the epoxy group contained in the epoxy group-containing polymer (A) and the epoxy group-containing compound (B), and the carboxyl group contained in the polycarboxylic acid derivative (C) are high, viscosity rise can hardly be generated during the ejecting operation from the ejection head of the ink-jet method so that the excellent straightness of drop direction from the ink-jet head and sustainability of drop mass magnitude can be provided as well as a preferable viscosity can be maintained from immediately after preparation over a long term in the state of the ink composition. Moreover, the storage stability is extremely excellent compared to the conventional one.

The ink composition is generally prepared to achieve a solid concentration from about 5 to about 30% by weight. In the present invention, even in the case that a solid concentration of the ink composition is 20% by weight or more, or it is higher like 25% by weight or more, the ink composition is excellent in storage stability. The viscosity of the ink composition stored in a closed vessel at 25° C. for one, three and six months after preparation can be controlled to preferably not more than 1.1 times the initial viscosity, more preferably not more than 1.05 times the initial viscosity. Herein, the viscosity is measured by means of a rotational vibration viscometer such as VISCOMATE VM-1G (product name; manufactured by Yamaichi Electronics Co., Ltd.) at 23° C. The 50% average particle size of the ink composition stored in a closed vessel at 25° C. for one, three and six months after preparation can be controlled to preferably not more than 1.2 times the initial 50% average particle size, more preferably not more than 1.1 times the initial 50% average particle size. Herein, the 50% average particle size is measured by means of a particle size analyzer such as MICROTRAC UPA (product name; manufactured by NIKKISO CO., LTD.) by a dynamic light scattering method (Doppler scattering light analysis) at 23° C.

As mentioned above, compared to the prior art, the ink composition of the present invention has advantages that it is excellent in storage stability, capable of long-term storage in the form of one component and no precipitation is generated during storage and at the time of use. Further, the rest of the ink composition (coating liquid) left after subjecting it to the first use is not deteriorated yet after a short working time. Therefore it is possible to reuse such a rest of the liquid by recovering it or additionally pouring a fresh ink composition (coating liquid) into there, thus being economical.

In addition, since the ink composition of the present invention has an optimal acid/epoxy equivalence ratio, the acid and epoxy of which are the above-specified essential components, a cured layer thereof is excellent in adhesive property with respect to the substrate, and it is also excellent in heat resistance and solvent resistance. A very high cross-linking density of the cured layer produced in the present invention is presumed to considerably contribute to exhibiting excellent adhesive property, heat resistance and solvent resistance of the cured layer. Moreover, since a layer having a precise pattern can be accurately formed by stably ejecting from the head of the ink-jet method, the ink composition of the present invention can be particularly suitably used for forming an organic layer with a certain pattern such as a pixel or a light shielding layer of a color filter of a display device or a solid-state image sensor.

(Physical Properties of Cured Layer)

A cured layer formed from the ink-jet ink for a color filter of the present invention is excellent in various properties which are required for detail portions of the color filter, such as heat resistance which concerns extent of, for example, thickness reduction or discoloration due to heating, solvent resistance or adhesive property or other properties. For example, it is possible to form a cured layer having one or more of the following extents of properties such as solvent resistance, adhesive property or heat resistance on a transparent substrate with the use of the ink-jet ink for a color filter of the present invention.

a) Solvent Resistance (Chemical Resistance)

After a color filter provided with a cured layer is dipped in any one of solvents selected from the group consisting of isopropyl alcohol, N-methylpyrolidone or γ-butyrolactone at 40° C. for one hour, the cured layer can exhibit 10% or less of thickness reduction in every case of dipping in any one of these solvents, wherein reduction of the layer thickness is determined by measuring thickness of the cured layer before and after dipping, and calculating based on the measured values. Further, color-difference before and after the dipping can be 1 or less.

b) Adhesive Property

After a color filter provided with a cured layer is dipped in a pure water at 80° C. for one hour, the cured layer can exhibit 8 points or more in a result of the cross-cut tape-peeling test defined in 8.5 of JIS-K 5400 (1990).

c) Heat Resistance after Forming ITO

Even after forming an ITO layer on a cured layer of a color filter and treating the same at 180° C. for one hour, no cracks or wrinkles can be formed on the ITO layer and the cured layer.

2. Color Filter and Production Method of Color Filter

The color filter according to the present invention comprises at least a substrate and a coloring layer provided on the substrate, wherein the coloring layer is formed by curing the ink-jet ink composition for a color filter according to the present invention.

The coloring layer in the present invention is a layer being colored, and specifically, there may be a pixel, a light shielding layer or the like of the color filter.

Since the coloring layer is formed by curing the ink-jet ink composition for a color filter according to the present invention having a high reactive site concentration, the cross-linking density is high and the coloring layer is excellent in adhesive property, heat resistance and solvent resistance; thus, the color filter according to the present invention is a highly reliable color filter. The constitution and the production method of the color filter of the present invention are not particularly limited; however, for example, it may employ the constitution to be hereinafter described and may be produced by suitably using the production method of the color filter according to the present invention to be hereinafter described.

The production method of the color filter according to the present invention is characterized by comprising the steps of forming an ink layer by making the ink-jet ink composition for a color filter according to the present invention selectively adhere on a predetermined area of a substrate by the ink-jet method; and forming a cured layer by curing the ink layer.

Since the production method of the color filter according to the present invention comprises the step of forming an ink layer by making the ink-jet ink composition according to the present invention selectively adhere by the ink-jet method, the excellent sustainability of drop direction of the ink composition and drop mass magnitude can be provided so that a minute and precise ink layer can be accurately formed. In addition, since the production method comprises a step of forming a cured layer by curing the ink layer formed with the use of the ink-jet ink having a high reactive site concentration of the present invention, a cured layer having a high cross-linking density and excellent in heat resistance, adhesive property, and solvent resistance can be obtained. Moreover, cost reduction or an increase in yield is achievable since it is a production method using the ink-jet method.

The ink-jet ink composition for a color filter according to the present invention is contained with a desired pigment such as R, G, B, black or the like, made to selectively adhere to a predetermined area on a transparent substrate of the color filter by the ink jet method, and heated to be cured, thereby forming a cured layer such as a pixel part, a light shielding layer or the like.

The following is one example of a production method of a color filter comprising the above-mentioned steps. First, as shown in FIG. 1(A), a transparent substrate 1 of the color filter is taken. As this transparent substrate, substrates which have hitherto been used for a color filter can be used, without limitation, such as a transparent rigid material having no flexibility such as quartz glass, Pyrex glass, synthetic quartz glass and the like, or a transparent flexible material having the flexibility such as a transparent resin film, a resin plate for optics and the like. Among them, 7059 glass in the trade name produced by Corning Co., Ltd. is a material having the small thermal expansion coefficient and is excellent in the dimensional stability and the workability at heat-treatment at an elevated temperature and, additionally, since it is non-alkali glass containing no alkaline component in a glass, it is suitable for a color filter for a color liquid crystal display apparatus by an active matrix system. In the present invention, a transparent material is usually used for a transparent substrate and a reflective substrate and white-colored substrate may be used. Alternatively, as a substrate, substrates having the surface treated as required for preventing the alkali dissolution, for imparting the gas barrier properties or for other objects may be used.

Next, as shown in FIG. 1(B), a light shielding part 2 is formed on one side of the transparent substrate 1 so as to be disposed in an area to be a border part between the each pixel part. It is possible to form the light shielding part 2 by forming a thin metal layer of chromium or the like having the thickness of around 1,000 to 2,000 Å by a sputtering method, a vacuum metallizing method or the like, and patterning this thin metal layer. As this patterning method, the conventional patterning method such as sputtering and the like can be used.

Alternatively, the light shielding part 2 may be a layer containing a shading particle such as a carbon fine particle, a metal oxide, an inorganic pigment, an organic pigment, and the like in a resin binder. As a resin binder used, alone or a mixture of two or more of a polyimide resin, an acrylic resin, an epoxy resin, polyacrylamide, polyvinyl alcohol, gelatin, casein, cellulose and the like, a photosensitive resin, an O/W emulsion-type ink composition, for example, an emulsified reactive silicone can be used. The thickness of such resin light shielding part can be set in a range of 0.5 to 10 μm. As a method of patterning such resin light shielding part, methods which are generally used such as a photolithography method and a printing method can be used.

Next, as shown in FIG. 1(C), an ink-repellent convex part is formed, as required, on the pattern of the light shielding part. The composition of such an ink-repellent convex part is not particularly limited as long as it is an ink composition having the ink-repellent property. In addition, the composition is not necessarily transparent and may be colored. For example, a material which is used for a light shielding part and which is a material with no black material incorporated therein can be used. More particularly, mention may be made of a composition of a water soluble resin such as polyacrylamide, polyvinyl alcohol, gelatin, casein, cellulose and the like alone or a mixture of two or more of them, and an ink composition such as O/W emulsion, for example, an emulsified reactive silicone. In the present invention, a photocuring resin is suitably used for the reasons of easy handling and curing. In addition, since this ink-repellent convex part is preferable as it grows ink-repellent, the surface thereof may be treated with an ink-repellent treating agent such as a silicone compound and a fluorine-containing compound.

A patterning operation of the ink-repellent convex part can be carried out by the printing method using a coating liquid of the ink-repellent ink composition, or by the photolithography using a photocurable coating liquid. An ink-repellent convex part is preferably relatively higher because it is provided for preventing an ink from mixing upon coloring with an ink jet method but, in view of the flatness of the whole when it is made into a color filter, the thickness near that of the pixel part is preferable. More particularly, a preferable range is usually from 0.1 to 2.0 μm although it is different depending upon an accumulated amount of an ink shot.

Alternatively, in the forming of the ink-repellent convex part, surface treatment such as plasma treatment or the like may be employed to add the ink-repellent property. As the surface treatment, for example, there may be mentioned low-pressure plasma treatment or atmospheric-pressure plasma treatment in which plasma irradiation is performed under a reduced-pressure atmosphere or an atmospheric-pressure atmosphere with the use of gas containing fluorine or fluorine compounds as introduced gas. When plasma treatment is performed in gas containing fluorine compounds and oxygen, in parallel with said reaction, a phenomenon that the fluorine compounds are incorporated into the surface of an organic material may occur in organic materials. Especially, under the condition that fluorine compounds exceed oxygen, for example, under a gas atmosphere having an excess amount of fluorine compounds, such that an amount of fluorine compounds with respect to a total amount of the fluorine compounds and oxygen is controlled to 60% or more, a phenomenon of incorporation of fluorine compounds is more active than oxidation by oxygen. Thus, the organic material surface is nonpolarized by the incorporation phenomenon and provided with the ink-repellent property.

Next, as the ink for forming the pixel part of each color, an ink-jet ink composition of each color according to the present invention is prepared. Then, as shown in FIG. 1(D), an ink layer is formed by shooting the ink for forming the pixel part of each color, through the ink jet method, to a pixel part forming area of corresponding color 4R, 4G or 4B which is defined on a surface of the transparent substrate 1 by the pattern of the light shielding layer 2. In this operation of shooting the ink, the ink for forming the pixel part hardly generates the viscosity rise at a nozzle end of the head 5 and it keeps a good ejecting performance. Accordingly an ink of a desired color can be made to precisely and uniformly adhere to a predetermined pixel part forming area, thereby forming a pixel part with a precise pattern and without color non-uniformity and color missing. In addition, since an ink for forming the pixel part of each color can be shot on a surface of the substrate at the same time by means of plural heads, the operating efficiency can be improved in comparison with a case of forming the pixel part by every color.

Next, as shown in FIG. 1(E), an ink layer 6R, 6G or 6B of each color is dried, prebaked as needed and thereafter cured by heating. When the ink layer is heated, cross-linking components of a curable resin contained in the ink cause a cross-linking reaction, thereby curing the ink layer.

Pixels are generally formed in the three primary colors of red (R), green (G) and blue (B). The coloring pattern shape of the pixels can be known arrangement such as a stripe type, a mosaic type, a triangle type, four-pixel arrangement type or the like, and the coloring area can be set optionally.

Next, as shown in FIG. 1 (F), a protect layer S is formed on a side on which the pixel parts 7R, 7G and 7B are disposed of the transparent substrate. The protect layer is provided in order to planarize the color filter and also to prevent components contained in the pixel part and so on from eluting into a liquid crystal layer of the liquid crystal display device. The thickness of a protect layer can be set in view of the light transmittance of a material used, the surface condition of a color filter and the like and, for example, it can be set in a range of 0.1 to 2.0 μm. A protect layer can be formed with the use of a resin having the light transmittance required for a transparent protect layer among the known transparent photosensitive resin, two-pack curing type transparent resin and the like.

A color filter 101 is produced in such a manner with the use of the ink-jet ink composition for a color filter according to the present invention. In the above-mentioned example, a pixel part is formed with the use of the ink composition of the present invention. According to the ink jet method using the ink-jet ink composition for a color filter according to the present invention, it is possible to form not only the pixel part but also the light shielding part 2 or the like in a desired pattern.

To form the light shielding part 2, firstly, a light shielding part forming ink, which is the ink-jet ink composition for a color filter of the present invention and comprises a light shielding colorant such as a black pigment or the like, is prepared. The ink for forming a light shielding part is made to selectively adhere to a predetermined area on a surface of the transparent substrate 1 by the ink jet method to form an ink layer in a predetermined pattern, then the ink layer is cured by a method such as irradiation of ionizing radiation or the like and baked as needed, thus forming a light shielding part.

In the above example, as shown in FIG. 1(B), the light shielding part 2 is formed on one side of the transparent substrate 1 so as to be disposed in an area to be a border part between the each pixel part, and as shown in FIG. 1(C), an ink-repellent convex part 3 is further formed thereon. Alternatively, it is possible to provide only a light shielding part 2 that is relatively high and also works as a partition, with the functions of both of the light shielding part 2 and the ink-repellent convex part 3 on the substrate.

The light shielding part 2 in this case preferably has the ink-repellent property. For example, there may be a water-repellent light shielding part incorporated with a water-repellent material, a water-repellent light shielding part having a surface applied with a water-repellent material, a light shielding part provided with the water-repellent properties by plasma treatment or the like. Means for adding the water-repellent properties may be the same as those employed for adding the ink-repellent property to the convex part mentioned above.

The production method of a color filter according to the present invention preferably comprises further a step of forming an ink layer forming area with an ink affinity larger than that of the surroundings by selectively changing wettability in a predetermined area of the substrate surface and forms an ink layer by making the ink-jet ink for a color filter according to the present invention selectively adhere on the ink layer forming area by the ink-jet method. By making the ink adhere on the ink layer forming area with a large ink affinity, the wetting and spreading property of the ink increases so as to prevent color missing or unevenness of layer thickness more efficiently, thus obtaining a pixel which generates no uneven luminance or uneven color.

There is no particular limitation to the process of forming an ink layer forming area with an ink affinity larger than that of the surroundings by selectively changing wettability in a predetermined area of the substrate surface, and a surface treatment such as the above-mentioned plasma treatment or the like may be employed. For example, When plasma treatment is performed in gas containing fluorine compounds and oxygen, unreacted groups are generated on the surface of an inorganic material by plasma discharge. The unreacted groups are oxidized by oxygen so that polar groups such as a carbonyl group, a hydroxyl group and so on are generated. Thus, the inorganic material surface is provided with an ink affinity. On the other hand, in parallel with said reaction, a phenomenon that the fluorine compounds are incorporated into the surface of an organic material may occur in organic materials. Especially, under the condition that fluorine compounds exceed oxygen, for example, under a gas atmosphere having an excess amount of fluorine compounds, such that an amount of fluorine compounds with respect to a total amount of the fluorine compounds and oxygen is controlled to 60% or more, a phenomenon of incorporation of fluorine compounds is more active than oxidation by oxygen. Thus, the organic material surface is nonpolarized by the incorporation phenomenon and provided with the ink-repellent property. Accordingly, when plasma treatment is performed, after forming the light shielding part 2 and a convex part with an organic material on the glass substrate, in the condition as mentioned above that an amount of the fluorine compounds is excess, an ink affinity of the glass substrate surface corresponding to the ink layer forming area becomes larger than that of the surroundings, the light shielding part 2 and the convex part are provided with the ink-repellent property, and the convex part becomes an ink-repellent convex part 3. On the ink layer forming area thus obtained, ink is liable to wetly spread, color missing or unevenness of layer thickness can be prevented, and further ink can be prevented from flowing from the convex part, which is fallen into a border part with another ink layer forming area. Alternatively, in this case, by forming the light shielding part 2 with an inorganic material and a convex part with an organic material, the ink affinity of the glass substrate and the light shielding part 2 increases, and the convex part becomes ink-repellent.

On the other hand, as another method of the process of forming an ink layer forming area with an ink affinity larger than that of the surroundings by selectively changing the wettability in a predetermined area of the substrate surface, there may be a method of forming an ink layer forming area with an ink affinity larger than that of the surroundings by forming a wettability-variable layer capable of changing the wettability in the direction of enlarging the ink affinity by the function of a photocatalyst on a transparent substrate of the color filter and then selectively changing the wettability in a predetermined area of the surface of the wettability-variable layer by exposure.

In a case of providing such a wettability-variable layer on a substrate, it is preferable to use the ink prepared with the use of a solvent, as a main solvent, with a 25° or more contact angle with respect to the surface of a test piece with a 30 mN/m critical surface tension found in a Zisman plotting graph using a standard liquid specified in the wettability test defined in the JIS-K6768, and measuring the contact angle (θ) 30 seconds later from contact with liquid droplets, and a 10° or less contact angle with respect to the surface of a test piece with a 70 mN/m critical surface tension found in the same measurement method.

One example of the embodiment for providing such a wettability-variable layer on a substrate in the production method of the color filter according to the present invention will be described hereafter. First, as shown in FIG. 2(A) a light shielding part 2 is formed on one side of the transparent substrate 1 of the color filter so as to be disposed in an area to be a border part between the each pixel part. A pixel part forming area of corresponding color 4R, 4G or 4B is defined by the pattern of the light shielding part. As the transparent substrate 1, the same one as that raised in the example explained using FIG. 1 can be used. As the light shielding part 2, the same one as that raised in the example explained using FIG. 1 can be provided as well.

Next, as shown in FIG. 2(B), a photocatalyst-containing layer 9 as the wettability-variable layer is formed in an unfigured pattern (i.e., a solid pattern) in at least a part of the area, particularly in this example, in an area including the pixel part forming area, on a surface of the transparent substrate 1.

Next, as shown in FIG. 2(C), the photocatalyst-containing layer 9 is exposed by irradiating with a light 12 via a photomask 10 to increase an ink affinity of the pixel part forming areas 4R, 4G and 4B.

When wettability in the pixel part forming area on the wettability-variable layer such as the above-mentioned photocatalyst-containing layer 9 is selectively changed to increase an ink affinity of this area, the ink of the present invention easily adheres on and uniformly spreads in the pixel part forming area, and is strongly repelled in and is eliminated from an area surrounding the pixel part forming area to the contrary so as to adhere on the pixel part forming area selectively and uniformly, thus forming a pixel part with a precise pattern and without uneven color and color missing.

A preferable wettability-variable layer to be used for this method is one exhibits a 20 to 50 mN/m critical surface tension found in a Zisman plotting graph using a standard liquid specified in the wettability test defined in the JIS-K6768, and measuring the contact angle (θ) 30 seconds later from contact with liquid droplets before changing its wettability, while exhibiting a 40 to 120 mN/m critical surface tension, more preferably a 70 to 110 mN/m critical surface tension found in the same measurement method after changing its wettability.

When a wettability-variable layer capable of changing a critical surface tension in such manner is used, the ink exhibits a very small contact angle in a pattern forming area whose ink affinity is raised by changing the wettability such as the pixel part forming area or the like, and on the other hand, it exhibits a very large contact angle in a surrounding area of the pattern forming area, thus taking a considerably great difference of the wettability.

In the case of carrying out the exposure using the photomask 10, it is preferable to take a width of an exposed portion 11 so as to be larger than that of the pixel part forming area 4 while securing a non-exposed portion at a boundary area between the pixel part forming areas adjacent to each other. Since the entire pixel part forming area 4 is sufficiently exposed in such a manner and an ink affinity is raised, disadvantages such as the color missing in the pixel part is not caused. The photocatalyst-containing layer 9 may be exposed in a predetermined pattern, not using the photomask, but using the other method such as photolithography to scan with the laser beam. Further, when the transparent substrate is exposed from a rear side opposite to a surface provided with the photocatalyst-containing layer 9, the light shielding part 2 functions as the photomask, and thus the photomask is not necessary.

A light for irradiating the photocatalyst-containing layer 9 may be either a visible light or an invisible radiation insofar as activating a photocatalyst, and a light containing ultraviolet spectra is normally used. As a light source including the ultraviolet spectra, for example, there may be a mercury lamp, a metal halide lamp, a xenon lamp and the like. The wavelength of the light used for this exposure can be set from a range of 400 nm or less, preferably 380 nm or less. In addition, an amount of the light to be irradiated upon exposure may be an amount of irradiation necessary for an exposed part to increase the hydrophilic properties by the action of a photocatalyst.

As a wettability-variable layer capable of changing the wettability in the direction of enlarging the ink affinity, for example, not only a) one containing a photocatalyst and increasing in hydrophilic property of itself by the action of a photocatalyst such as the photocatalyst-containing layer 9 shown diagrammatically, but also the followings can also be exemplified:

b) one provided with a photocatalyst-containing layer beneath the wettability-variable layer (i.e., the transparent substrate side) in which hydrophilic property of the wettability-variable layer is increased by the function of a photocatalyst present in the photocatalyst-containing layer;

c) one provided with a decomposition type wettability-variable layer comprising a photocatalyst and a binder decomposable by function of the photocatalyst in which an exposed portion of the decomposition type wettability-variable layer is decomposed and eliminated to exposing a base surface with hydrophilic property such as a transparent substrate surface or the like; and alternatively d) one provided with a photocatalyst-containing layer beneath a decomposition type wettability-variable layer comprising a binder decomposable by function of the photocatalyst in which an exposed portion of the decomposition type wettability-variable layer is decomposed and eliminated by function of the photocatalyst contained in the photocatalyst-containing layer to exposing a base surface with hydrophilic property such as a surface of the photocatalyst-containing layer or the like.

"A wettability-variable layer capable of changing the wettability in the direction of enlarging the ink affinity" in the present invention means, in a lamination product composed by disposing the wettability-variable layer on a substrate, such a layer as capable of changing wettability of a surface on which the wettability-variable layer is formed in the direction of enlarging the ink affinity. It includes not only ones increasing the ink affinity of the wettability-variable layer itself such as the above examples a) and b), but also ones decomposing the wettability-variable layer to exposing a base surface with the ink affinity such as the above examples c) and d).

Herein, as the above-mentioned a) one containing a photocatalyst and increasing in hydrophilic property of itself by the action of a photocatalyst such as the photocatalyst-containing layer 9 shown diagrammatically and b) one provided with a photocatalyst-containing layer beneath the wettability-variable layer (i.e., the transparent substrate side) in which hydrophilic property of the wettability-variable layer is increased by the function of a photocatalyst present in the photocatalyst-containing layer, ones described in paragraphs [0149] to [0174] of Japanese Patent Application Laid-Open (JP-A) No. 2001-350012 may be suitably used.

Next, an ink for forming a pixel part of each color which is fallen into the ink-jet ink for a color filter of the present invention and contains one or more kinds of pigments is prepared. Then, the ink for forming a pixel part of each color is selectively made to adhere onto the pixel part forming area 4R, 4G and 4B which has enhanced in the ink affinity in the above-mentioned process of FIG. 2(C), thereby forming an ink layer 6R, 6G and 6B as shown in FIG. 2(D).

Next, as shown in FIG. 2(E), the ink layer of each color 6R, 6G and 6B is dried, prebaked as needed and thereafter cured by heating, followed by baking as needed, to form a pixel part of each color 7R, 7G and 7B. When the ink layer is heated, cross-linking components of a curable resin contained in the ink-jet ink cause a cross-linking reaction, thereby curing the ink layer.

Next, as shown in FIG. 2(F), a protect layer 8 is formed on a side on which the pixel parts 7R, 7G and 7B are disposed of the transparent substrate. The curing process and the protect layer forming process as shown in FIGS. 2(E) and 2(F) may be conducted in the same manner as described in the example explained using FIG. 1.

In other examples, a color filter 102 is produced in this manner. In this example, a pixel part is formed with the use of the ink for forming the pixel part which is the ink-jet ink for a color filter according to the present invention; however, a cured layer other than the pixel part such as the light shielding part 2 can be formed in a desired pattern by making the ink according to the present invention selectively adhere only on an area with an ink affinity using the difference in wettability on the substrate surface.

The present invention is not limited by the above-mentioned embodiments. The above-mentioned embodiments are examples, and any that has the substantially same essential features as the technical ideas described in claims of the present invention and exerts the same effects and advantageous is included in the technical scope of the present invention.

EXAMPLES

Though the present invention will be hereinafter explained by way of examples, the scope of the present invention is not restricted by these examples. All designations of "part" or "parts" are "part by weight" or "parts by weight" unless otherwise specifically indicated.

Preparation Examples A-1 and A-2

Synthesis of Epoxy Group-Containing Polymer (A))

In accordance with a combination ratio indicated in Table 1, 44 parts by weight of diethylene glycol monobutylether acetate (hereinafter referred to as BCA), which is a solvent not containing a hydroxyl group, was fed into a four-neck flask provided with a thermometer, a reflux condenser, an agitator and a dropping funnel, and its temperature was raised at 115° C. by heating while agitating. Subsequently, 56 parts by weight of a mixture (a dropping material) of monomers, a polymerization initiator and the solvent BCA not containing a hydroxyl group with a combination ratio indicated in Table 1 was dropped into the solvent from the dropping funnel at constant speed for two hours while keeping a temperature at 115° C. After the dropping operation, it was maintained at a temperature of 115° C. for 2.5 hours. Thereafter, the temperature was increased to 125° C., and it was maintained at a temperature of 125° C. for two hours to finish the reaction, thus obtaining the epoxy group-containing polymers (A-1) and (A-2) having properties described in Table 1.

TABLE 1

Polymerization of polymer having epoxy group

|  |  | A-1 | A-2 |
|---|---|---|---|
| Initially fed solvent | Diethylene glycol monobutylether acetate (BCA) | 44.0 | 44.0 |
| Dropping material (parts by weight) *1) | GMA | 28.4 | 14.2 |
|  | CHMA *2) | 21.6 | — |
|  | St *2) | — | 35.8 |
|  | PERBUTYL I | 5.0 | 5.0 |
|  | Diethylene glycol monobutylether acetate (BCA) | 1.0 | 1.0 |
| Properties | Observation *3) | Clear and colorless | Clear and colorless |
|  | Solid content (wt %) *4) | 55.4 | 55.9 |
|  | Epoxy equivalence of Solution (g/mol) *5) | 509 | 990 |
|  | Viscosity (Pa · s) *6) | 6.8 | 8.3 |
|  | Weight average molecular weight *7) | 8,200 | 14,500 |

Abbreviations in Table 1 mean as follows.
*1) GMA: Glycidyl methacrylate; St: Styrene; CHMA: cyclohexyl methacrylate; and PERBUTYL I (product name): tert-butylperoxy isopropyl monocarbonate (manufactured by NOF Corporation)
*2) A-1: CHMA was used; A-2: St was used.
*3) Observation: An appearance by naked eyes is indicated.
*4) Solid content: A test was carried out in accordance with JIS-K 5407 "4. solid content".
*5) Epoxy equivalence: After a cycle-opening reaction of the epoxy group was carried out with the use of an excessive amount of 0.2 N hydrochloric acid of dioxane solution, unreacted hydrochloric acid was subject to back-titration with the use of 0.1 N KOH of ethanol solution to calculate an epoxy equivalence.
*6) It was measured by means of an E type viscometer at 23° C.
*7) Weight-average molecular weight: it is a calibrated value based on polystyrene, measured by GPC method.

Preparation Example C-1

Synthesis of Polycarboxylic Acid Derivative (C)

34 parts by weight of BCA, 27 parts by weight of 1,2,4-cyclohexanetricarboxylic acid (hereinafter referred to as CHTA; manufactured by Mitsubishi Gas Chemical Company, Inc.) and 39 parts by weight of n-propyl vinyl ether (hereinafter referred to as nPr-VE) were fed into a four-neck flask provided with a thermometer, a reflux condenser, an agitator and a dropping funnel, and its temperature was raised at 80° C. by heating while agitating. Subsequently, the temperature was maintained at 80° C. while agitating to finish the reaction at a time when an acid value of the mixture gets to 2.0 mg KOH/g or less, thus obtaining the curing agent solution (C-1) having an acid value of 0.77 mg KOH/g and two or more blocked carboxyl groups.

Preparation Examples C-2 and C-3, and Comparative Preparation Example of C'-4

Synthesis of Polycarboxylic Acid Derivative (C) and Comparative Polycarboxylic Acid Derivative (C'))

Polycarboxylic acid derivatives (C-2 and C-3) in the same manner as in Preparation example C-1 and a comparative polycarboxylic acid derivative (C'-4) were obtained. A combination ratio of each material, a reaction temperature, an acid value and a total acid equivalence are shown in Table 2.

TABLE 2

| | | Synthesis of polycarboxylic acid derivative | | | |
|---|---|---|---|---|---|
| | | C-1 | C-2 | C-3 | C'-4 |
| Combination ratio | Polycarboxylic acid compound (parts by weight) | CHTA 27 | CHTA 27 | PE-HHPA *2 48 | TMA *3 27 |
| | Vinyl ether (parts by weight) | nPr-VE 39 | iPr-VE *1 39 | nPr-VE 27 | nPr-VE 39 |
| | BCA (parts by weight) | 34 | 34 | 25 | 34 |
| Reaction temperature (° C.) | | 80 | 70 | 80 | 70 |
| Acid value (mg KOH/g) | | 0.77 | 0.81 | 1.76 | 0.65 |
| Solid content (% by weight) | | 60 | 61 | 72 | 61 |
| Total acid equivalence (g/mol) | | 270 | 270 | 400 | 260 |

Abbreviations in Table 2 mean as follows.
*1) Isopropyl vinyl ether
*2) A half-ester of pentaerythritol (hereinafter referred to as PE) and hexahydrophthalic anhydride (hereinafter referred to as HHPA.) In Formula (1), the 6-membered ring corresponds to a cyclohexyl ring, R1 corresponds to a pentaerythrityl residue, n is 4, m1 is 0, and t1 is 0.
*3) 1,2,4-trimellitic acid

Examples 1 to 6 and Comparative Examples 1 to 4

Ink-Jet Ink Composition (1) Preparation of Binder Composition and Comparative Binder Composition A rotor coated with Tefron (in trade name) was charged into a sample bottle, and the sample bottle was mounted on a magnetic stirrer. Into the sample bottle, the above-synthesized epoxy-group containing polymer (A), an epoxy-group containing compound (B) and the above-synthesized polycarboxylic acid derivative (C) were introduced in accordance with a combination ratio indicated in Table 3, and dissolved at the room temperature by sufficiently stirring. Subsequently, a diluting solvent for adjusting viscosity was added therein and dissolved by stirring, and thereafter a filtration was carried out, thus obtaining binder compositions (α-1) to (α-5) (solid content: 50% by weight) and comparative binder compositions (α'-6) to (α'-9) (solid content: 50% by weight). The composition and properties of each binder composition are shown in Tables 3 and 4.

TABLE 3

| | | Combination ratio of binder composition | | | | |
|---|---|---|---|---|---|---|
| | | Binder No. | | | | |
| | | α-1 | α-2 | α-3 | α-4 | α-5 |
| Component (A) | Kind | A-1 | A-1 | A-1 | A-2 | A-2 |
| | Parts by weight | 72.8 | 54.1 | 76.1 | 54.7 | 59.6 |
| | Parts by weight in solid content *3 | 40.3 | 30.0 | 42.2 | 30.6 | 33.3 |

TABLE 3-continued

Combination ratio of binder composition

| | | Binder No. | | | | |
|---|---|---|---|---|---|---|
| | | α-1 | α-2 | α-3 | α-4 | α-5 |
| Component (B) *1 | Kind | B-1 | B-2 | B-3 | B-2 | B-3 |
| | Parts by weight | 27.2 | 105.0 | 41.9 | 93.5 | 37.9 |
| | Parts by weight in solid content *3 | 27.2 | 52.5 | 20.9 | 46.7 | 19.0 |
| Component (C) | Kind | C-1 | C-2 | C-2 | C-3 | C-3 |
| | Parts by weight | 54.1 | 28.7 | 60.5 | 31.6 | 66.3 |
| | Parts by weight in solid content *3 | 32.5 | 17.5 | 36.9 | 22.7 | 47.7 |
| Component (D) *1 | Kind | BCA | BCA | BCA | BCA | BCA |
| | Parts by weight | 43.9 | 10.2 | 19.5 | 18.3 | 36.2 |
| Component (E) *1 | Kind | LC-10 | LC-10 | LC-10 | LC-10 | |
| | Parts by weight | 2.0 | 2.0 | 2.0 | 2.0 | |
| Carboxyl group/Epoxy group equivalence ratio | | 0.7 | 0.8 | 0.9 | 1.0 | 1.1 |
| Initial viscosity (mPa · s) *2 | | 83.7 | 111.5 | 94.8 | 98.3 | 86.9 |
| Viscosity after one month (mPa · s) *4 | | 84.5 | 114.8 | 96.7 | 103.1 | 89.6 |
| Viscosity increase rate (%) | | 101 | 103 | 102 | 105 | 103 |
| Evaluation | | ○ | ○ | ○ | ○ | ○ |

TABLE 4

Combination ratio of comparative binder composition

| | | Binder No. | | | |
|---|---|---|---|---|---|
| | | α'-6 | α'-7 | α'-8 | α'-9 |
| Component (A) | Kind | A-1 | A-2 | A-1 | A-2 |
| | Parts by weight | 66.1 | 58.9 | 67.1 | 76.1 |
| | Parts by weight in solid content *3 | 36.7 | 32.9 | 37.2 | 42.5 |
| Component (B) *1 | Kind | B-1 | B-2 | B-1 | B-3 |
| | Parts by weight | 37.0 | 100.6 | 25.1 | 75.4 |
| | Parts by weight in solid content *3 | 37.0 | 50.3 | 25.1 | 37.7 |
| Component (C) | Kind | C-1 | C-2 | C'-4 | CHTA |
| | Parts by weight | 43.9 | 27.5 | 61.8 | 19.8 |
| | Parts by weight in solid content *3 | 26.3 | 16.8 | 37.7 | 19.8 |
| Component (D) *1 | Kind | BCA | BCA | BCA | BCA |
| | Parts by weight | 51.0 | 13.0 | 44.0 | 26.7 |
| Component (E) *1 | Kind | LC-10 | | LC-1 | LC-10 |
| | Parts by weight | 2.0 | | 2.0 | 2.0 |
| Carboxyl group/Epoxy group equivalence ratio | | 0.5 | 1.2 | 0.9 | 1.2 |
| Initial viscosity (mPa · s) *2 | | 77.2 | 110.0 | 82.4 | 93.2 |
| Viscosity after one month (mPa · s)*4 | | 80.2 | 116.6 | 123.7 | 291.6 |
| Viscosity increase rate (%) | | 104 | 105 | 150 | 313 |
| Evaluation | | ○ | ○ | x | x |

Abbreviations in Tables 3 and 4 mean as follows.
*1) B-1: EPIKOTE 828EL (product name; manufactured by Japan Epoxy Resins Co., Ltd.; epoxy equivalence: 190 g/mol; molecular weight: about 380); B-2: EPIKOTE 1007 (product name; manufactured by Japan Epoxy Resins Co., Ltd.; epoxy equivalence: 1,975 g/mol; molecular weight: about 2,900); B-3: EPIKOTE 157 (product name; manufactured by Japan Epoxy Resins Co., Ltd.; epoxy equivalence: 210 g/mol; molecular weight: about 2,100); BCA: diethylene glycol monobutylether acetate; LC-1: NOFCURE LC-1 (product name; manufactured by NOF Corporation); LC-10: NOFCURE LC-10 (product name; manufactured by NOF Corporation); and C-5': CHTA (1,2,4-cyclohexane tricarboxylic acid)
*2) It was measured by means of an E type viscometer at 23° C.
*3) It means "parts by weight" calibrated to solid content of each component.
*4) Viscosity after storage at 5° C. for one month was measured by means of an E type viscometer at 23° C. As for a viscosity increase rate, "○" means a viscosity increase of 110% or less, and "x" means a viscosity increase of more than 110%.

(2) Preparation of Pigment Dispersion

Each pigment, a pigment dispersing agent and an organic solvent were mixed at the following ratio. The mixture was added with 500 parts by weight of zirconia beads having 0.3 mm diameter and subject to dispersion for four hours by means of PAINT SHAKER (product name; manufactured by Asada Iron Works Co., Ltd), thus preparing red pigment dispersions, PR254 pigment dispersion (C.I. Pigment Red 254) and PR177 pigment dispersion (C.I. Pigment Red 177).

[Composition of Pigment Dispersion]
Each pigment: 10 parts by weight
Pigment dispersing agent (product name: DISPERBYK 161; manufactured by BYK Japan KK; solid content in BCA solvent: 30% by weight): 10 parts by weight Pigment dispersing assistant agent (copolymer of N-phenylmaleimide and benzyl methacrylate; solid content in BCA solvent: 30% by weight): 10 parts by weight
BCA (diethylene glycol monobutylether acetate): 70 parts by weight (3) Preparation of Ink-Jet Ink Composition for Red Pixel A rotor coated with Tefron (trade name) was charged into a prepared sample bottle, and the prepared sample bottle was mounted on a magnetic stirrer. Into the prepared sample bottle, the above-mentioned red pigment dispersions (PR254 pigment dispersion and PR177 pigment dispersion) and the binder compositions mentioned in the above Tables 3 and 4 were introduced so as to adjust a combination ratio of each component according to Table 5, and dissolved by sufficiently stirring. Subsequently, a diluting solvent for adjusting viscosity was added therein and dissolved by stirring, and thereafter a filtration was carried out, thus obtaining ink-jet ink compositions for a red pixel of Examples 1 to 6 (solid content 22.0% by weight; P/V ratio: 0.59). Evaluation was performed according to the following evaluation method, and results thus obtained are shown in Table 5.

In the same manner, the above-mentioned red pigment dispersions 1 and 2, and the binder compositions mentioned in the above Tables 3 and 4 were introduced so as to adjust a combination ratio of each component according to Table 6, thus obtaining ink-jet ink compositions for a red pixel of Comparative examples 1 to 4 (solid content: 22.0% by weight; P/V ratio: 0.59). Evaluation was performed according to the following evaluation method, and results thus obtained are shown in Table 6.

(4) Property Evaluation

<Storage Stability>

Each ink-jet ink composition was measured for viscosity and particle size (50% average particle size) immediately after the preparation and after storage in a closed vessel at 25° C. for one, three and six months. The viscosity was measured by means of a rotational vibration viscometer (product name: VISCOMATE VM-1G; manufactured by Yamaichi Electronics Co., Ltd.) at 23° C. The particle size (50% average particle size) measurement was performed on each ink after the ink was diluted 100-fold with BCA (diethylene glycol monobutylether acetate) by means of a particle size analyzer (product name: MICROTRAC UPA MODEL 9230; manufactured by NIKKISO CO., LTD.) by a dynamic light scattering method at 23° C. with a measurement time of 360 seconds.

<Ejection Sustainability Test>

Each ink was charged into the ink-jet head and ejected from the head so as to be dropped to the central part of the pixel part forming area of a glass transparent substrate provided with the photocatalyst-containing layer and exposed in a predetermined pattern with a droplet size of 30 μm. Further, after the first ejection was discontinued to let the head stand for 30 minutes, the ink was dropped from the same head to the central part of another pixel part forming area with a droplet size of 30 μm. In such an intermittent ejection, the ejecting performance at the time when the first ejection was performed (ejecting performance in the early stage) and at the time when re-ejection was performed thereafter (intermittent ejection sustainability) was respectively observed and evaluated in accordance with the following standards.

[Evaluation Standard for Ejecting Performance in the Early Stage]
 ○: Ink can be ejected from all orifices of the head.
 Δ: Ink can be ejected from some orifices of the head.
 x: No ink can be ejected from most orifices of the head.

[Evaluation Standard for Intermittent Ejection Sustainability]
 ○: Ink can be re-ejected from all orifices of the head.
 Δ: Ink can be re-ejected from some orifices of the head.
 x: No ink can be re-ejected from most orifices of the head.

<Heat Resistance after ITO>

A substrate on which a red pixel pattern was formed was dipped in IPA for five minutes, then dried with IPA vapor and washed. At a temperature of the substrate of 200° C. and under a vacuum of $6 \times 10^{-3}$ Torr, an ITO (Indium Tin Oxide) electrode was deposited so as to have a thickness of 120 nm. After performing a heat resistance test at 180° C. for 60 minutes, the ITO electrode was subject to evaluation in accordance with the following standard.

[Evaluation Standard for Heat Resistance after ITO]
 ○: No irregularities such as wrinkles, cracks or the like were observed in ITO electrode.
 Δ: Some irregularities such as wrinkles, cracks or the like were observed in ITO electrode.
 x: Irregularities such as wrinkles, cracks or the like were observed in the entire area of ITO electrode.

<Solvent Resistance Test>

A substrate on which a red pixel pattern was formed was dipped in N-methylpyrrolidone at a liquid temperature of 40° C. for one hour, and a color difference ΔEab between states before and after dipping was calculated based on CIE 1976 standard. A practical measurement was carried out by means of a microspectrophotometer (product name: DSP-SP 100; produced by: Olympus Optical Industries, Corp.)

[Evaluation Standard]
 ○: ΔEab <1
 Δ: 1≦ΔEab <3
 x: 3≦ΔEab

<Adhesive Property Test>

On a substrate on which a red pixel pattern was formed, 11 vertical cut lines and 11 horizontal cut lines were made with a cutter at 1 mm intervals to cross at right angles. Scotch tape was lightly attached to the pattern by fingers and peeled off quickly. The appearance of the cuts was observed to evaluate in accordance with the following standard.

[Evaluation Standards]
 8 points: Slight peeling occurred at the intersections of the cut lines. Less than 5% of the total area of the squares was affected.
 6 points: Peeling occurred at the intersections of the cut lines. 5% or more but less than 15% of the total area of the squares was affected.
 4 points: The width of the peeled area was large. 15% or more but less than 35% of the total area of the squares is affected.
 2 points: The width of the peeled area was more than that in 4 points. 65% or more of the total area of the squares was affected.

TABLE 5

Ink-jet ink composition for red pixel, Combination ratio of Examples

| | | | Example No. | | | | | |
|---|---|---|---|---|---|---|---|---|
| | | | 1 | 2 | 3 | 4 | 5 | 6 |
| Ink No. | | | Ink 1 | Ink 2 | Ink 3 | Ink 4 | Ink 5 | Ink 6 |
| Pigment dispersion | | | Red pigment dispersion | Red pigment dispersion | Red pigment dispersion | Red pigment dispersion | Red pigment dispersion | Red pigment dispersion |
| Binder No. | | | α-1 | α-2 | α-3 | α-4 | α-5 | α-1 |
| Final Composition (composition when considering the whole amount as 100 parts by weight) *1 | | | | | | | | |
| Binder component | Component (A) | Kind | A-1 | A-1 | A-1 | A-2 | A-2 | A-1 |
| | | Parts by Weight | 3.35 | 2.63 | 3.69 | 2.67 | 2.98 | 4.01 |
| | Component (B) | Kind | B-1 | B-2 | B-3 | B-2 | B-3 | B-1 |
| | | Parts by Weight | 2.39 | 4.60 | 1.83 | 4.10 | 1.70 | 2.72 |
| | Component (C) | Kind | C-1 | C-2 | C-2 | C-3 | C-3 | C-1 |
| | | Parts by Weight | 2.84 | 1.53 | 3.24 | 1.99 | 4.26 | 3.23 |
| | Component (E) | Kind | LC-10 | LC-10 | LC-10 | LC-10 | | LC-10 |
| | | Parts by Weight | 0.18 | 0.18 | 0.18 | 0.18 | | 0.20 |
| Pigment | R254 | Parts by Weight | 7.49 | 7.49 | 7.49 | 7.49 | 7.49 | 8.51 |
| | R177 | Parts by Weight | 0.67 | 0.67 | 0.67 | 0.67 | 0.67 | 0.76 |

TABLE 5-continued

Ink-jet ink composition for red pixel, Combination ratio of Examples

| | | | Example No. | | | | | |
|---|---|---|---|---|---|---|---|---|
| | | | 1 | 2 | 3 | 4 | 5 | 6 |
| Dispersing agent | | Parts by Weight | 4.9 | 4.9 | 4.9 | 4.9 | 4.9 | 5.57 |
| Solvent | BCA | Parts by Weight | 78 | 78 | 78 | 78 | 78 | 75 |
| Total | | | 100 | 100 | 100 | 100 | 100 | 100 |
| Property Evaluation | | | | | | | | |
| Initial viscosity (mPa · s) | | | 7.98 | 9.34 | 8.34 | 8.91 | 8.13 | 9.20 |
| Viscosity after one month (mPa · s) | | | 7.98 | 9.35 | 8.35 | 8.92 | 8.14 | 9.20 |
| Viscosity after three months (mPa · s) | | | 7.98 | 9.36 | 8.35 | 8.93 | 8.14 | 9.21 |
| Viscosity after six months (mPa · s) | | | 7.99 | 9.37 | 8.36 | 8.95 | 8.14 | 9.22 |
| Initial median diameter based on volume (μm) | | | 0.121 | 0.152 | 0.131 | 0.135 | 0.125 | 0.146 |
| Median diameter based on volume after one month (μm) | | | 0.123 | 0.153 | 0.132 | 0.136 | 0.126 | 0.146 |
| Median diameter based on volume after three months (μm) | | | 0.125 | 0.155 | 0.132 | 0.136 | 0.127 | 0.147 |
| Median diameter based on volume after six months (μm) | | | 0.127 | 0.157 | 0.134 | 0.138 | 0.127 | 0.148 |
| Ejecting performance in the early stage | | | ○ | ○ | ○ | ○ | ○ | ○ |
| Intermittent ejection sustainability | | | ○ | ○ | ○ | ○ | ○ | ○ |
| Heat resistance after ITO | | | ○ | ○ | ○ | ○ | ○ | ○ |
| Solvent resistance | | | ○ | ○ | ○ | ○ | ○ | ○ |
| Adhesive property | | | 8 points | 8 points | 8 points | 8 points | 8 points | 8 points |

TABLE 6

Ink-jet ink composition for red pixel, Combination ratio of Comparative examples

| | | | Comparative example No. | | | |
|---|---|---|---|---|---|---|
| | | | 1 | 2 | 3 | 4 |
| Ink No. | | | Ink 7 | Ink 8 | Ink 9 | Ink 10 |
| Pigment dispersion | | | Red pigment dispersion | Red pigment dispersion | Red pigment dispersion | Red pigment dispersion |
| Binder No. | | | α'-6 | α'-7 | α'-8 | α'-9 |
| Final Composition (composition when considering the whole amount as 100 parts by weight) *1 | | | | | | |
| Binder component | Component (A) | Kind | A-1 | A-2 | A-1 | A-2 |
| | | Parts by Weight | 3.21 | 2.94 | 3.26 | 3.72 |
| | Component (B) | Kind | B-1 | B-2 | B-3 | B-3 |
| | | Parts by Weight | 3.25 | 4.50 | 2.20 | 3.31 |
| | Component (C) | Kind | C-1 | C-2 | C'-4 | C-3 |
| | | Parts by Weight | 2.30 | 1.50 | 3.30 | 1.73 |
| | Component (E) | Kind | LC-10 | | LC-1 | LC-10 |
| | | Parts by Weight | 0.18 | | 0.18 | 0.18 |
| Pigment | R254 | Parts by Weight | 7.49 | 7.49 | 7.49 | 7.49 |
| | R177 | Parts by Weight | 0.67 | 0.67 | 0.67 | 0.67 |
| Dispersing agent | | Parts by Weight | 4.9 | 4.9 | 4.9 | 4.9 |
| Solvent | BCA | Parts by Weight | 78 | 78 | 78 | 78 |
| Total | | | 100 | 100 | 100 | 100 |

TABLE 6-continued

Ink-jet ink composition for red pixel,
Combination ratio of Comparative examples

| | Comparative example No. | | | |
|---|---|---|---|---|
| | 1 | 2 | 3 | 4 |
| Property Evaluation | | | | |
| Initial viscosity (mPa · s) | 7.65 | 9.25 | 7.88 | 8.75 |
| Viscosity after one month (mPa · s) | 7.66 | 9.27 | 7.90 | 10.24 |
| Viscosity after three months (mPa · s) | 7.68 | 9.28 | 8.67 | 15.55 |
| Viscosity after six months (mPa · s) | 7.70 | 9.30 | 9.46 | 30.10 |
| Initial median diameter based on volume (μm) | 0.111 | 0.147 | 0.120 | 0.118 |
| Median diameter based on volume after one month (μm) | 0.113 | 0.148 | 0.122 | 0.156 |
| Median diameter based on volume after three months (μm) | 0.115 | 0.151 | 0.145 | 0.208 |
| Median diameter based on volume after six months (μm) | 0.117 | 0.155 | 0.155 | 0.234 |
| Ejecting performance in the early stage | ○ | ○ | ○ | Δ |
| Intermittent ejection sustainability | ○ | ○ | Δ | x |
| Heat resistance after ITO | x | ○ | ○ | x |
| Solvent resistance | x | ○ | ○ | x |
| Adhesive property | 6 points | 6 points | 8 points | 6 points |

Abbreviations in Tables 5 and 6 mean as follows.
*1) It means a combination ratio provided that a total amount including a solvent is considered as 100 parts by weight.
It is to be noted that a ratio of each component other than the solvent is indicated in terms of a weight calibrated to solid content.

From the results of Examples 1 to 5, it is found that the ink-jet ink composition according to the present invention was excellent in storage stability even though it has a high solid content of 22% by weight, and it was also excellent in ink ejecting performance, heat resistance after ITO, solvent resistance and adhesive property. From the results of Example 6, it is found that the ink-jet ink composition according to the present invention was excellent in storage stability even though it has a further high solid content of 25% by weight, and it was also excellent in ink ejecting performance, heat resistance after ITO, solvent resistance and adhesive property. Any of Examples 1 to 6 has excellent storage stability since the viscosity after storage at 25° C. for six months was restrained to not more than 1.01 times the initial viscosity, and the 50% average particle size after storage at 25° C. for six months was restrained to not more than 1.05 times the initial 50% average particle size in any case.

In contrast, Comparative example 1 was inferior to Examples in heat resistance, solvent resistance and adhesive property due to having a low carboxyl group/epoxy group equivalence ratio of 0.5. Comparative example 2 resulted in inferior adhesive property compared to Examples due to having a carboxyl group/epoxy group equivalence ratio of 1.2.

In Comparative example 3 using a polycarboxylic acid derivative instead of the component (C) in which 1,2,4-trimellitic acid was blocked, an increase in viscosity was confirmed after storage for three and six months. The viscosity after storage at 25° C. for six months was 1.2 times the initial viscosity, and the 50% average particle size after storage at 25° C. for six months was 1.29 times the initial 50% average particle size; thus, Comparative example 3 was inferior in storage stability to Examples. In addition, it was also inferior in ejection sustainability. Since no carboxylic acid was blocked, Comparative example 4 resulted in remarkably inferior storage stability. Further, it was also inferior in heat resistance, solvent resistance and adhesive property.

Example 7, Comparative Example 5

Preparation of Green Ink-Jet Ink for a Color Filter (1) Preparation of Pigment Dispersion Each pigment, a pigment dispersing agent, and an organic solvent were mixed at the following ratio. The mixture was added with 500 parts by weight of zirconia beads having 0.3 mm diameter and subject to dispersion for four hours by means of PAINT SHAKER (product name; manufactured by Asada Iron Works Co., Ltd), thus preparing PG36 pigment dispersion (C.I. Pigment Green 36), PG7 pigment dispersion (C.I. Pigment Green 7), PY138 pigment dispersion (C.I. Pigment Yellow 138) and PY150 pigment dispersion (C.I. Pigment Yellow 150).

[Composition of Pigment Dispersion]
Each pigment: 10 parts by weight
Pigment dispersing agent (product name: DISPERBYK 161; manufactured by BYK Japan KK; solid content in BCA solvent: 30% by weight): 10 parts by weight Pigment dispersing assistant agent (copolymer of N-phenylmaleimide and benzyl methacrylate; solid content: 30% by weight): 10 parts by weight BCA (diethylene glycol monobutylether acetate): 70 parts by weight (2) Preparation of Ink The above-prepared PG36 pigment dispersion of 21.22 parts by weight, PG7 pigment dispersion of 15.05 parts by weight, PY138 pigment dispersion of 27.16 parts by weight, PY150 pigment dispersion of 13.74 parts by weight, the binder composition of (α-3) of 19.31 parts by weight and BCA of 3.54 parts by weight were mixed well to prepare a green ink-jet ink of Example 7. A green ink-jet ink of Comparative example 5 was prepared in the same manner as in Example 7 except that the binder composition was changed to (α'-8). A combination ratio of each ink-jet ink is shown in Table 7.

Each ink-jet ink thus obtained was measured for viscosity immediately after the preparation and after storage at 25° C. for one month. The measurement results on viscosity are also shown in Table 7. The green ink-jet ink of Example 7 was excellent in storage stability; however, the green ink-jet ink of Comparative example 5 showed an increase in viscosity and thus was inferior in storage stability.

solvent: 30% by weight): 10 parts by weight Pigment dispersing assistant agent (copolymer of N-phenylmaleimide and benzyl methacrylate; solid content in BCA solvent: 30% by weight): 10 parts by weight BCA (diethylene glycol monobutylether acetate): 70 parts by weight

TABLE 7

| Composition (parts by weight) | | | Example 7 | Comparative Example 5 |
|---|---|---|---|---|
| Pigment dispersion | Pigment | C.I. Pigment Green 36 | 2.12 | 2.12 |
| | | C.I. Pigment Green 7 | 1.50 | 1.50 |
| | | C.I. Pigment Yellow 138 | 2.72 | 2.72 |
| | | C.I. Pigment Yellow 150 | 1.37 | 1.37 |
| | Pigment dispersing agent | DISPERBYK-161 | 2.32 | 2.32 |
| | | Copolymer of N-phenylmaleimide and benzyl methacrylate | 2.32 | 2.32 |
| Binder composition | Component (A) | A-1 | 3.99 | 3.51 |
| | Component (B) | B-3 | 1.98 | |
| | | B-1 | | 2.38 |
| | Component (C) | C-2 | 3.49 | |
| | Component (C') | C'-4 | | 3.57 |
| | Component (E) | LC-10 | 0.19 | |
| | | LC-1 | | 0.19 |
| Solvent (D) | | BCA | 78.0 | 78.0 |
| Evaluation on storage stability | | Initial viscosity (mPa · s) | 8.97 | 8.65 |
| | | Viscosity after one month (mPa · s) | 8.99 | 9.32 |

Example 8 and Comparative Example 6

Preparation of Blue Ink-Jet Ink for a Color Filter (1) Preparation of Pigment Dispersion Each pigment, a pigment dispersing agent, and an organic solvent were mixed at the following ratio. The mixture was added with 500 parts by weight of zirconia beads having 0.3 mm diameter and subject to dispersion for four hours by means of PAINT SHAKER (product name; manufactured by Asada Iron Works Co., Ltd), thus preparing PB15:6 pigment dispersion (C.I. Pigment Blue 15:6) and PV23 pigment dispersion (C.I. Pigment Violet 23).

[Composition of Pigment Dispersion]

Each pigment: 10 parts by weight

Pigment Dispersing agent (product name: DISPERBYK 161; manufactured by BYK Japan KK; solid content in BCA (2) Preparation of Ink The above-prepared PB15:6 pigment dispersion of 51.10 parts by weight, PV23 pigment dispersion of 3.49 parts by weight, the binder composition of (α-3) of 26.53 parts by weight and BCA of 18.88 parts by weight were mixed well to prepare a blue ink-jet ink of Example 8. A blue ink-jet ink of Comparative example 6 was prepared in the same manner as in Example 8 except that the binder composition was changed to (α'-8). A combination ratio of each ink-jet ink is shown in Table 8.

Each ink-jet ink thus obtained was measured for viscosity immediately after the preparation and after storage at 25° C. for one month. The measurement results on viscosity are also shown in Table 8. The blue ink-jet ink of Example 8 was excellent in storage stability; however, the blue ink-jet ink of Comparative example 6 showed an increase in viscosity and thus was inferior in storage stability.

TABLE 8

| Composition (parts by weight) | | | Example 8 | Comparative Example 6 |
|---|---|---|---|---|
| Pigment dispersion | Pigment | C.I. Pigment Blue 15:6 | 5.11 | 5.11 |
| | | C.I. Pigment Violet 23 | 0.35 | 0.35 |
| | Pigment dispersing agent | DISPERBYK-161 | 1.64 | 1.64 |
| | | Copolymer of N-phenylmaleimide and benzyl methacryiate | 1.64 | 1.64 |
| Binder composition | Component (A) | A-1 | 5.48 | 4.84 |
| | Component (B) | B-3 | 2.72 | |
| | | B-1 | | 3.26 |
| | Component (C) | C-2 | 4.80 | |
| | Component (C') | C'-4 | | 4.90 |
| | Component (E) | LC-10 | 0.26 | |
| | | LC-1 | | 0.26 |
| Solvent | | BCA | 78.0 | 78.0 |
| Evaluation on storage stability | | Initial viscosity (mPa · s) | 9.51 | 9.32 |
| | | Viscosity after one month (mPa · s) | 9.52 | 9.97 |

Example 9

Production of Color Filter

On a glass substrate (manufactured by Asahi Glass Co., Ltd.) having a thickness of 0.7 mm and a size of 10 cm×10 cm, a black matrix pattern having a line width 20 μm of and a layer thickness of 1.2 μm was formed with the use of a curable resin composition for a black matrix and by a photolithography method.

To a red pixel forming portion defined by the black matrix on the substrate, the red ink-jet ink of Example 3 stored at 25° C. for one month was made to accurately and uniformly adhere by the ink-jet method. Next, to a green pixel forming portion on the same substrate, the green ink-jet ink of Example 7 stored at 25° C. for one month was made to accurately and uniformly adhere by the ink-jet method. Next, to a blue pixel forming portion on the same substrate, the blue ink-jet ink of Example 8 stored at 25° C. for one month was made to accurately and uniformly adhere by the ink-jet method. In all of the red, green and blue ink-jet inks, ejection sustainability was excellent, no multiple ejection was generated, and no ink break of the pixel forming portion was generated when the inks were made to adhere thereto.

Then, drying under a reduced pressure of 10 Torr was performed thereon for 120 seconds, followed by prebaking on a hot plate heated to 80° C. for 10 minutes. Thereafter, in a clean oven, post-baking was performed by heating at 200° C. for 30 minutes, followed by another heating at 230° C. for 30 minutes, thus forming pixel patterns of the three RGB colors having an average layer thickness after drying and curing of 1.8 μm on the substrate. The layer thickness was measured with the use of MICROMAP 557N (product name; manufactured by US Micromap Co.)

The substrate on which the R, G and B pixel patterns were formed was dipped in IPA for five minutes, then dried with IPA vapor and washed. At a temperature of the substrate of 200° C. and under a vacuum of 6×10$^{-3}$ Torr, an ITO (Indium Tin Oxide) electrode was deposited so as to have a thickness of 120 nm. The substrate with the deposited ITO electrode was further dipped in IPA for five minutes, subject to vapor washing with IPA and then spin coated with polyimide, followed by baking at 180° C. for 60 minutes to form an orientation layer, thus obtaining a color filter.

The measured chromaticity values for red, green and blue are respectively (x=0.648, y=0.335, Y=20.0), (x=0.290, y=0.570, Y=54.0), and (x=0.136, y=0.095, Y=11.1). Compared to a color filter of Comparative example 7 to be hereinafter described, "Y" of the blue color (luminance) was improved.

Comparative Example 7

Production of Color Filter

Pixel patterns of the three RGB colors having an average layer thickness after drying and curing of 1.8 μm were formed on a substrate in the same manner as in Example 9 except that the red ink-jet ink of Comparative example 3 after storage at 25° C. for one month was used as the red ink-jet ink, the green ink-jet ink of Comparative example 5 after storage at 25° C. for one month was used as the green ink-jet ink, and the blue ink-jet ink of Comparative example 6 after storage at 25° C. for one month was used as the blue ink-jet ink.

In the green and blue ink-jet inks which showed an increase in viscosity and thus were inferior in storage stability, ejection sustainability was inferior, multiple ejections were generated, and the pixel forming portions were partially broken when the inks were made to adhere thereto.

The measured chromaticity values for red, green and blue are respectively (x=0.648, y=0.335, Y=20.0), (x=0.290, y=0.570, Y=54.0), (x=0.136, y=0.095, Y=11.0) Compared to the color filter of Example 9, "Y" of the blue color (luminance) was slightly inferior.

The invention claimed is:

1. An ink-jet ink composition for a color filter comprising an epoxy group-containing polymer (A) having a weight average molecular weight from 2,000 to 20,000 in terms of the polystyrene calibrated-weight average molecular weight and an epoxy equivalence from 140 to 1,000 g/mol which is polymerized using at least a monomer having a carbon-carbon unsaturated bond and an epoxy group; an epoxy group-containing compound (B) having two or more epoxy groups, a molecular weight from 160 to 7,000 and an epoxy equivalence from 80 to 3,500 g/mol; and a polycarboxylic acid derivative (C) in which carboxylic acid (c1) having the structure represented by the following Formula (1') is rendered latent by vinyl ether (c2), wherein the equivalence ratio of carboxyl groups rendered latent by the polycarboxylic acid derivative (C) to the total epoxy groups contained in the epoxy-group containing polymer (A) and the epoxy-group containing compound (B) is in the range from 0.7 to 1.1, Formula (1'):

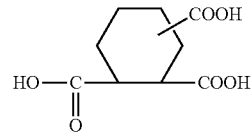

wherein a 6-membered ring of Formula (1') is an alicyclic hydrocarbon.

2. An ink-jet composition for a color filter, wherein the ink-jet composition for a color filter according to claim 1 is dissolved or dispersed in an organic solvent (D).

3. The ink-jet ink composition for a color filter according to claim 1 wherein the ink-jet ink composition comprises a thermal potential catalyst (E) to show the activity at the time of thermal curing.

4. The ink-jet ink composition for a color filter according to claim 1, wherein the ink-jet ink composition further comprises a pigment.

5. The ink-jet ink composition for a color filter according to claim 1, wherein the organic solvent (D) contains as the main solvent a solvent component having a 180° C. to 260° C. boiling point and a 0.5 mmHg or less vapor pressure from 18° C. to 25° C. by a 80% by weight or more ratio with respect to the total amount of the solvent.

6. A production method of a color filter comprising the steps of:
    forming an ink layer by making the ink-jet ink composition for a color filter according to claim 1 selectively adhere on a predetermined area of a substrate by the ink-jet method; and
    forming a cured layer by heating the ink layer.

7. The production method of a color filter according to claim 6 further comprising the step of forming an ink layer forming area with an ink affinity larger than that of the surroundings by selectively changing wettability in a predetermined area of the substrate surface, wherein an ink layer is formed by making the ink-jet ink composition for a color filter according to claim 1 selectively adhere on the ink layer forming area by the ink-jet method.

8. A color filter comprising at least a substrate and a coloring layer provided on the substrate, wherein the coloring layer is formed by curing the ink-jet ink composition for a color filter according to claim 1.

* * * * *